United States Patent
Ortiz-Soto et al.

(10) Patent No.: US 11,008,995 B2
(45) Date of Patent: May 18, 2021

(54) DYNAMIC CHARGE COMPRESSION IGNITION ENGINE WITH MULTIPLE AFTERTREATMENT SYSTEMS

(71) Applicant: Tula Technology, Inc., San Jose, CA (US)

(72) Inventors: Elliott A. Ortiz-Soto, San Jose, CA (US); Matthew A. Younkins, Campbell, CA (US)

(73) Assignee: Tula Technology, Inc., San Jose, CA (US)

( * ) Notice: Subject to any disclaimer, the term of this patent is extended or adjusted under 35 U.S.C. 154(b) by 0 days.

(21) Appl. No.: 16/694,621

(22) Filed: Nov. 25, 2019

(65) Prior Publication Data

US 2020/0088151 A1    Mar. 19, 2020

Related U.S. Application Data

(63) Continuation of application No. 16/021,532, filed on Jun. 28, 2018, now Pat. No. 10,808,672.
(Continued)

(51) Int. Cl.
*F02P 5/04* (2006.01)
*F02D 13/06* (2006.01)
(Continued)

(52) U.S. Cl.
CPC ............ *F02P 5/045* (2013.01); *F01N 13/009* (2014.06); *F01N 13/011* (2014.06);
(Continued)

(58) Field of Classification Search
CPC .. F02B 69/00; F02B 69/06; F02B 1/12; F02D 37/00; F02D 2041/0012; F02D 2250/18;
(Continued)

(56) References Cited

U.S. PATENT DOCUMENTS

| | | | |
|---|---|---|---|
| 4,434,767 | A | 3/1984 | Kohama et al. |
| 4,489,695 | A | 12/1984 | Kohama et al. |

(Continued)

FOREIGN PATENT DOCUMENTS

| | | |
|---|---|---|
| WO | WO 2010/006311 | 1/2010 |
| WO | WO 2011/085383 | 7/2011 |

OTHER PUBLICATIONS

International Search Report and Written Opinion dated Nov. 8, 2018 from International Application No. PCT/US18/40028.
(Continued)

*Primary Examiner* — George C Jin
(74) *Attorney, Agent, or Firm* — Beyer Law Group LLP

(57) ABSTRACT

Methods, devices, controllers, and algorithms are described for operating an internal combustion engine wherein at least some firing opportunities utilize low temperature gasoline combustion (LTGC). Other firing opportunities may be skipped or utilize some other type of combustion, such as spark ignition. The nature of any particular firing opportunity is dynamically determined during engine operation, often on a firing opportunity by firing opportunity basis. Firings that utilize LTGC produce little, if any, nitrous oxides in the exhaust stream and thus, in some implementations, may require no aftertreatment system to remove them from the exhaust stream.

39 Claims, 13 Drawing Sheets

Related U.S. Application Data

(60) Provisional application No. 62/528,352, filed on Jul. 3, 2017.

(51) Int. Cl.

| | | |
|---|---|---|
| *F02P 5/15* | (2006.01) | |
| *F02D 41/00* | (2006.01) | |
| *F02D 41/30* | (2006.01) | |
| *F02D 13/02* | (2006.01) | |
| *F01N 13/00* | (2010.01) | |
| *F02B 1/12* | (2006.01) | |

(52) U.S. Cl.
CPC ......... *F02D 13/0257* (2013.01); *F02D 13/06* (2013.01); *F02D 41/008* (2013.01); *F02D 41/0087* (2013.01); *F02D 41/3035* (2013.01); *F02D 41/3076* (2013.01); *F02P 5/1512* (2013.01); *F02B 1/12* (2013.01); *F02D 13/0211* (2013.01); *F02D 13/0226* (2013.01); *F02D 13/0265* (2013.01); *F02D 13/0269* (2013.01); *F02D 13/0273* (2013.01); *F02D 2041/0012* (2013.01); *F02D 2250/18* (2013.01); *F02P 5/1504* (2013.01)

(58) Field of Classification Search
CPC ............. F02D 13/0226; F02D 13/0207; F02D 13/0215; F02D 13/0257; F02D 13/0261; F02D 13/0269; F02D 13/0273; F02D 13/0265; F02D 41/0305; F02D 41/3076; F02D 41/006; F02D 41/0087; F02D 41/3029; F02D 41/3011; F01L 1/34; F02P 5/045; F02P 5/1512; F02M 26/01
See application file for complete search history.

(56) References Cited

U.S. PATENT DOCUMENTS

| | | | |
|---|---|---|---|
| 4,509,488 A | 4/1985 | Forster et al. | |
| 5,050,550 A | 9/1991 | Gao | |
| 5,377,631 A | 1/1995 | Schechter | |
| 6,158,411 A | 12/2000 | Morikawa | |
| 6,619,258 B2 | 9/2003 | McKay et al. | |
| 6,659,071 B2 | 12/2003 | LaPointe et al. | |
| 7,063,062 B2 | 6/2006 | Lewis et al. | |
| 7,066,136 B2 | 6/2006 | Ogiso | |
| 7,086,386 B2 | 8/2006 | Doering | |
| 7,104,349 B2 | 9/2006 | Gray | |
| 7,503,312 B2 | 3/2009 | Surnilla et al. | |
| 7,571,602 B2 | 8/2009 | Koch | |
| 7,577,511 B1 | 8/2009 | Tripathi et al. | |
| 7,909,013 B2 | 3/2011 | Shkolnik et al. | |
| 7,930,087 B2 | 4/2011 | Gibson et al. | |
| 8,069,663 B2 | 12/2011 | Ulrey et al. | |
| 8,099,224 B2 | 1/2012 | Tripathi et al. | |
| 8,225,594 B2 | 7/2012 | Kaneko et al. | |
| 8,495,992 B2 | 7/2013 | Roth | |
| 8,601,811 B2 | 12/2013 | Pursifull et al. | |
| 8,701,409 B2 | 4/2014 | Pursifull et al. | |
| 8,869,773 B2 | 10/2014 | Tripathi et al. | |
| 9,086,020 B2 | 7/2015 | Tripathi et al. | |
| 9,399,964 B2 | 7/2016 | Younkins et al. | |
| 9,476,373 B2 | 10/2016 | Younkins et al. | |
| 9,518,506 B2 | 12/2016 | Leone et al. | |
| 9,689,327 B2 * | 6/2017 | Younkins | F02D 37/02 |
| 9,689,328 B2 | 6/2017 | Younkins et al. | |
| 9,726,094 B2 | 8/2017 | Younkins et al. | |
| 10,072,592 B2 | 9/2018 | Younkins et al. | |
| 10,107,220 B2 | 10/2018 | Ulrey et al. | |
| 10,233,796 B2 | 3/2019 | Shost et al. | |
| 2003/0131805 A1 | 7/2003 | Yang | |
| 2006/0144356 A1 | 7/2006 | Sellnau et al. | |
| 2009/0272363 A1 | 11/2009 | Yun et al. | |
| 2010/0050993 A1 | 3/2010 | Zhao et al. | |
| 2010/0116249 A1 | 5/2010 | Guerrassi et al. | |
| 2011/0048372 A1 | 3/2011 | Dibble et al. | |
| 2012/0042633 A1 * | 2/2012 | Silvestri | F02D 17/02 60/274 |
| 2012/0046853 A1 | 2/2012 | Silvestri et al. | |
| 2012/0090319 A1 | 4/2012 | Mond et al. | |
| 2015/0316005 A1 | 11/2015 | Madison et al. | |
| 2017/0130630 A1 | 5/2017 | Younkins et al. | |
| 2017/0218866 A1 * | 8/2017 | Shost | F02D 17/02 |
| 2017/0321617 A1 | 11/2017 | Kalluri et al. | |
| 2017/0370308 A1 | 12/2017 | Hashemi et al. | |
| 2018/0320614 A1 | 11/2018 | Younkins et al. | |
| 2019/0003442 A1 | 1/2019 | Ortiz-Soto et al. | |
| 2019/0003443 A1 | 1/2019 | Ortiz-Soto et al. | |

OTHER PUBLICATIONS

U.S. Office Action dated Sep. 16, 2019 from U.S. Appl. No. 16/022,017.

* cited by examiner

ATMOSPHERE

DYNAMIC CHARGE COMPRESSION IGNITION ENGINE WITH MULTIPLE AFTERTREATMENT SYSTEMS

CROSS-REFERENCE TO RELATED APPLICATIONS

This application is a Continuation of U.S. application Ser. No. 16/021,532, filed on Jun. 28, 2018 which claims priority of U.S. Provisional Patent Application No. 62/528,352, entitled "Dynamic Charge Compression Ignition Engine", filed Jul. 3, 2017, both of which are incorporated by reference herein for all purposes.

This application is related to U.S. application Ser. No. 15/485,000 filed Apr. 11, 2017 (now U.S. Pat. No. 10,072, 592). Application Ser. No. 15/485,000 is a Continuation of U.S. application Ser. No. 15/274,029 (now U.S. Pat. No. 9,689,328) filed Sep. 23, 2016, which is a Divisional of U.S. application Ser. No. 15/180,332 (now U.S. Pat. No. 9,476, 373), filed Jun. 13, 2016. U.S. application Ser. No. 15/180, 332 is a Divisional of U.S. application Ser. No. 14/919,011 (now U.S. Pat. No. 9,399,964), filed Oct. 21, 2015, which claims priority to U.S. Provisional Patent Application Nos.: 62/077,439, entitled "Multi Level Dynamic Skip Fire," filed Nov. 10, 2014; 62/117,426, entitled "Multi Level Dynamic Skip Fire," filed Feb. 17, 2015; and 62/121,374, entitled "Using Multi-Level Skip Fire," filed Feb. 26, 2015. All of these related applications are incorporated herein in their entirety for all purposes.

FIELD OF THE INVENTION

The present invention relates generally to dynamic firing level modulation engine operation in which some firing opportunities utilize lean-burn, low temperature gasoline combustion and other firing opportunities utilize standard stoichiometric, spark-ignition combustion. The present invention also relates to using two aftertreatment systems, one optimized for lean burn operation and the other optimized for stoichiometric operation.

BACKGROUND

Most vehicles in operation today (and many other devices) are powered by internal combustion (IC) engines. An internal combustion engine typically has a reciprocating piston which oscillates within a cylinder. Combustion occurs within the cylinder and the resulting torque is transferred by the piston through a connecting rod to a crankshaft. For a four-stroke engine, air, and in some cases fuel, is inducted to the cylinder through an intake valve and exhaust combustion gases are expelled through an exhaust valve. In typical engine operation, the cylinder conditions vary in a cyclic manner, encountering, in order, an intake, compression, expansion, and exhaust stroke in a repeating pattern. Each repeating pattern may be referred to as a working cycle of the cylinder. The working cycles associated with the various engine cylinders are temporally interleaved, so that the expansion stroke associated with the various cylinders is approximately equally spaced, delivering the smoothest engine operation. Combustion occurring in the expansion stroke generates the desired torque as well as various exhaust gases.

Fuel efficiency of internal combustion engines can be substantially improved by varying the displacement of the engine in response to the demanded torque. Full displacement allows for the full torque to be available when required, yet using a smaller displacement when full torque is not required can significantly reduce pumping losses and improve thermal efficiency. The most common method today of implementing a variable displacement engine is to deactivate a group of cylinders substantially simultaneously. In this approach the intake and exhaust valves associated with the deactivated cylinders are kept closed and no fuel is injected when it is desired to skip a combustion event. For example, an 8-cylinder variable displacement engine may deactivate half of the cylinders (i.e. 4 cylinders) so that it is operating using only the remaining 4 cylinders. Commercially available variable displacement engines available today typically support only two or at most three displacements.

Another engine control approach that varies the effective displacement of an engine is referred to as "skip fire" engine control. In general, skip fire engine control contemplates selectively skipping the firing of certain cylinders during selected firing opportunities. Thus, a particular cylinder may be fired or active during one engine cycle and then may be skipped or passive during the next engine cycle and then selectively skipped or fired during the next. Skip fire engine operation is distinguished from conventional variable displacement engine control in which a designated set of cylinders are deactivated substantially simultaneously and remain deactivated as long as the engine remains in the same variable displacement mode. Thus, the sequence of specific cylinders' firings will always be the same for each engine cycle during operation in a variable displacement mode (so long as the engine remains in the same displacement mode), whereas that is often not the case during skip fire operation. For example, an 8-cylinder skip fire controlled engine operating at a firing fraction of ⅓ will after differ patterns of fired and skipped cylinders on successive engine cycles.

In general, skip fire engine operation facilitates finer control of the effective engine displacement than is possible using a conventional variable displacement approach. For example, firing every third cylinder in a 4-cylinder engine would provide an effective displacement of $\frac{1}{3}^{rd}$ of the full engine displacement, which is a fractional displacement that is not obtainable by simply deactivating a set of cylinders. Conceptually, virtually any effective displacement can be obtained using skip fire control, although in practice most implementations restrict operation to a set of available firing fractions, sequences, or patterns. The Applicant has filed a number of patents describing various approaches to skip fire control. By way of example, U.S. Pat. Nos. 8,099,224; 8,464,690; 8,651,091; 8,839,766; 8,869,773; 9,020,735; 9,086,020; 9,120,478; 9,175,613; 9,200,575; 9,200,587; 9,291,106; 9,399,964, and others describe a variety of engine controllers that make it practical to operate a wide variety of internal combustion engines in a dynamic skip fire (DSF) operational mode. Each of these patents is incorporated herein by reference. Many of these patents relate to DSF control in which firing decisions regarding whether to skip or fire a particular cylinder during a particular working cycle are made in real time—often just briefly before the working cycle begins and often on an individual cylinder firing opportunity by firing opportunity basis.

In some applications, referred to as multi-level dynamic skip fire (mDSF), individual working cycles that are fired may be purposely operated at different cylinder outputs levels—that is, using purposefully different air charges and corresponding fueling levels. By way of example, U.S. Pat. No. 9,399,964 describes some such approaches. The individual cylinder control concepts used in dynamic skip fire can also be applied to dynamic multi-charge level engine operation in which all cylinders are fired, but individual working cycles are purposely operated at different cylinder output levels. Dynamic skip fire and dynamic multi-charge level engine operation may collectively be considered different types of dynamic firing level modulation engine operation in which the output of each working cycle (e.g., skip/fire, high/low, skip/high/low, etc.) is dynamically determined during operation of the engine, typically on an individual cylinder working cycle by working cycle (firing opportunity by firing opportunity) basis. It should be appreciated that dynamic firing level engine operation is different than conventional variable displacement in which when the engine enters a reduced displacement operational state, a defined set of cylinders are operated in generally the same manner until the engine transitions to a different operational state.

An internal combustion engine typically operates in a repetitive series of working cycle to generate engine torque. The working cycle may be characterized by the thermodynamic cycle used. The thermodynamic cycle may be depicted on a pressure-volume diagram and may take many forms. Some exemplary thermodynamic cycles include an Otto cycle, a Miller cycle, an Atkinson cycle, and a Diesel cycle. In addition to the thermodynamic cycle used, working cycles may be characterized in other ways, for example, by the in-working chamber temperature, fuel/air stoichiometry, or combustion initiation method. Some working cycles initiate combustion using an electrical spark and are referred to as spark ignition (SI) working cycles. These SI working cycles could include Miller or Atkinson cycles, as well as lean burn SI or any type of working cycle using spark ignition. Some working cycles initiate combustion using self-heating of gases trapped in the working chamber during the compression stroke. Some working cycles combust a heterogeneous mixture of air and fuel, while other working cycles utilize a homogeneous charge. Some working cycles have equal expansion and compression ratios, while other working cycles have physically different expansion and compression ratios or achieve effectively different ratios by changing the inducted air charge thru early or late intake valve closure. The many different working cycles have various attributes, such as fuel efficiency and operational load range. The different working cycles may also produce different combustion temperatures, generate different levels and types of noxious emissions in their exhaust stream, and operate at different air to fuel ratios.

Although the engines described in the cited prior art work well, there are continuing efforts to further improve fuel economy in engines operating under dynamic firing level modulation control. The present application describes additional features and enhancements that can improve engine performance in a variety of applications.

SUMMARY

The present invention relates to dynamic firing level modulation control, which includes both dynamic skip fire, multi-level dynamic skip fire, and dynamic multi-charge level engine. In one aspect, a method for controlling an engine is described. Selected working cycles are skipped and selected active working cycles are fired to deliver a desired engine output. One or more working chambers are capable of generating multiple possible levels of torque output e.g., for the same cam phaser and/or MAP (intake manifold absolute pressure) settings. A particular level of torque output (e.g., high or low torque output) is selected for each of the fired working chambers. The low torque level output utilizes a low temperature gasoline combustion (LTGC) working cycle. The LTGC may be a homogeneous charge compression ignition (HCCI) working cycle, a partially premixed compression ignition (PPCI) working cycle, or some other type of LTGC working cycle. Various embodiments relate to engine controllers, software, and systems that help implement the above method.

In some embodiments, the LTGC working cycle is a homogeneous charge compression ignition (HCCI) working cycle. HCCI operation may be produced by either recompression and re-expansion of trapped gas in the working chamber or by inducting exhaust gas into the working chamber during its intake stroke. The HCCI working cycles are temporally interleaved with skipped and/or some other type of working cycle to deliver the requested engine torque.

In other embodiments, both the high and low torque level firings utilize a LTGC working cycle. Intermediate torque output levels can be obtained by temporally interleaving low and high torque output firings to deliver a requested torque.

Dynamic firing level modulation control may be performed in a wide variety of ways. In some embodiments, for example, decisions regarding whether to fire or skip each working cycle and/or decisions whether to select a particular level of torque output for a fired working chamber are performed on a firing opportunity by firing opportunity basis.

In yet another embodiment, two aftertreatment systems may be used with an internal combustion engine capable of operating in both stoichiometric and lean burn modes. One aftertreatment system is used for stoichiometric working cycles, while the second is used for lean burn working cycles.

The various aspects and features described above may be implemented separately or in any combination.

BRIEF DESCRIPTION OF THE DRAWINGS

The invention and the advantages thereof, may best be understood by reference to the following description taken in conjunction with the accompanying drawings in which.

In the drawings, like reference numerals are sometimes used to designate like structural elements. It should also be appreciated that the depictions in the figures are diagrammatic and not to scale.

DETAILED DESCRIPTION

The present invention relates to methods and systems for operating an internal combustion engine wherein some firing opportunities in a dynamic firing level modulation controlled engine utilize low temperature gasoline combustion (LTGC). Other firing opportunities may be skipped or utilize some other type of combustion, such as spark ignition. The nature of any particular firing opportunity is dynamically determined during engine operation, often on a firing opportunity by firing opportunity basis. Firings that utilize LTGC produce little, if any, nitrous oxides ($NO_x$) in combustion and thus require no aftertreatment system to remove them from a combustion exhaust stream. One type of LTGC is homogeneous charge compression ignition (HCCI) where a homogenous fuel air mixture auto ignites. Typically, HCCI uses a lean air-to-fuel ratio. Other types of LTGC include gasoline direct compression ignition (GDCI), spark assisted compression ignition (SACI), and partially premixed compression ignition (PPCI). In GDCI and PPCI fuel auto ignites as it is injected into a hot air charge caused by compression of an inducted air charge. In SACI a spark is used to control ignition timing rather than relying on auto-ignition. In PPCI a stratified charge is used to manage the fuel burn rate.

Operating an engine with LTGC working cycles is often advantageous. For example, operation in HCCI mode is advantageous for at least two reasons. First, HCCI is more fuel efficient than spark-ignited (SI) combustion for a given cylinder load. HCCI has fuel efficiency improvements in the range of 10-18% for light cylinder loads, such as cylinder loads of 1 to 4 bar brake mean effective pressure (BMEP). The fuel consumption improvements are due to the rapid rate of heat release resulting from bulk auto-ignition and unthrottled operation. A second advantageous feature of HCCI is that it produces very low levels of harmful emissions. HCCI typically utilizes an extremely lean or diluted fuel-to-air mixture and the resulting combustion results in low combustion temperatures and complete, or near complete, fuel oxidation. Despite lean operation, exhaust gas $NO_x$ levels comfortably meet certification standards without expensive exhaust aftertreatment systems. HCCI can also be implemented and controlled relatively cheaply with variable valve actuation based on cam actuated intake and exhaust valves and does necessarily require high pressure fuel injectors or special ignition systems.

Figure 1:
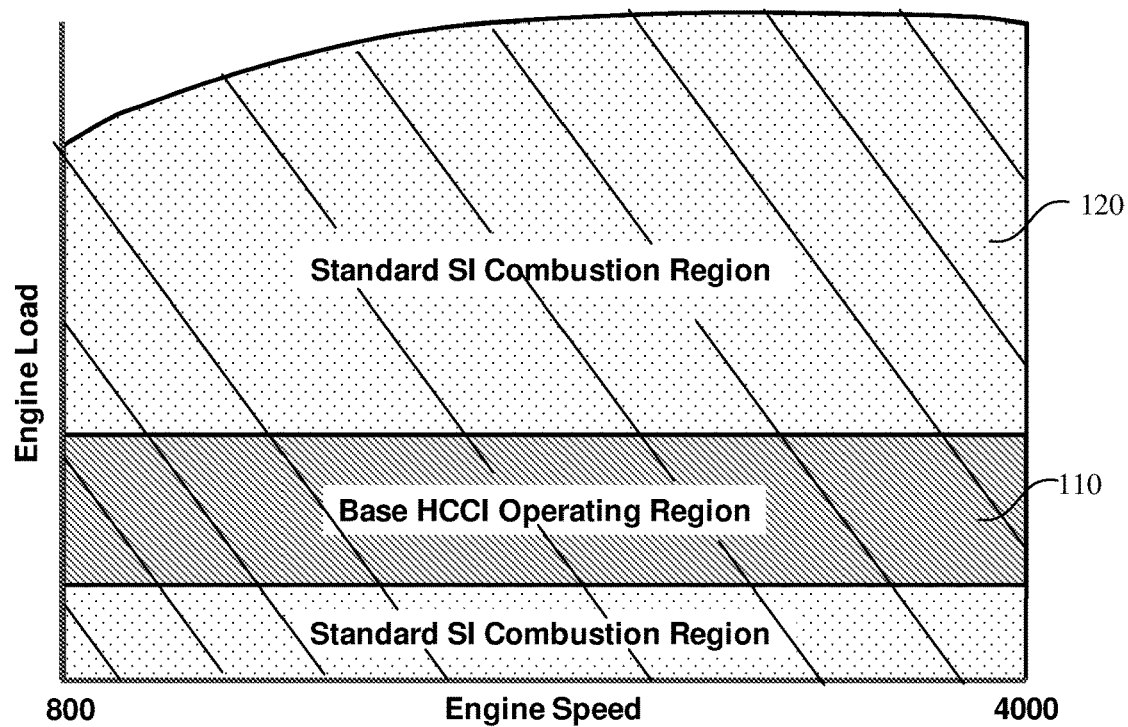
FIG. 1 shows an operating region for an HCCI operated engine superimposed on an operating region for a naturally-aspirated, throttle-controlled, spark-ignition (SI) operated engine.

Unfortunately, HCCI in its simplest and most efficient form is limited by high rates of pressure rise and combustion noise for heavy loads, and combustion stability near the lean flammability limit for light loads. For heavy loads $NO_x$ emissions may also exceed regulated levels without use of a lean burn aftertreatment systems. A typical HCCI operating region 110 is generally confined to a 1 to 4 bar BMEP range between engine speeds of 800 and 4000 rpm as shown in FIG. 1. This range is representative only and HCCI may be operated outside of this range depending on engine design details. The HCCI operating region is constrained for low engine loads by combustion stability and at high engine loads by pressure-rise rates, combustion noise, Extensive research efforts have been expended attempting to expand this region, including intake air boosting, multiple injection strategies, spark-assistance, and dual-fuel operation, among others. However, these concepts generally require specialized new hardware and complex calibrations, which can make the technology prohibitively expensive.

Also shown in FIG. 1 is an operating region 120 for a naturally-aspirated, throttle-controlled, spark-ignition combustion engine, which both covers the HCCI operating region 110 and extends to higher and lower engine loads. A desirable attribute of SI operation is its large operating range, which meets the varying torque and speed demands encountered in typical motor vehicle operation. Undesirable aspects of SI operation include a requirement for a three-way catalyst (TWC) aftertreatment system to reduce noxious emissions and relatively low efficiency as compared to HCCI operation. The current invention provides for mixed mode operation, mixing SI (or some other type of working cycle) and HCCI (or some other type of LTGC working cycle) operation dynamically, in some cases on a working cycle by working cycle basis, to provide a requested engine output torque at high fuel efficiency over a larger operating range than can be achieved using HCCI alone.

Figure 2:
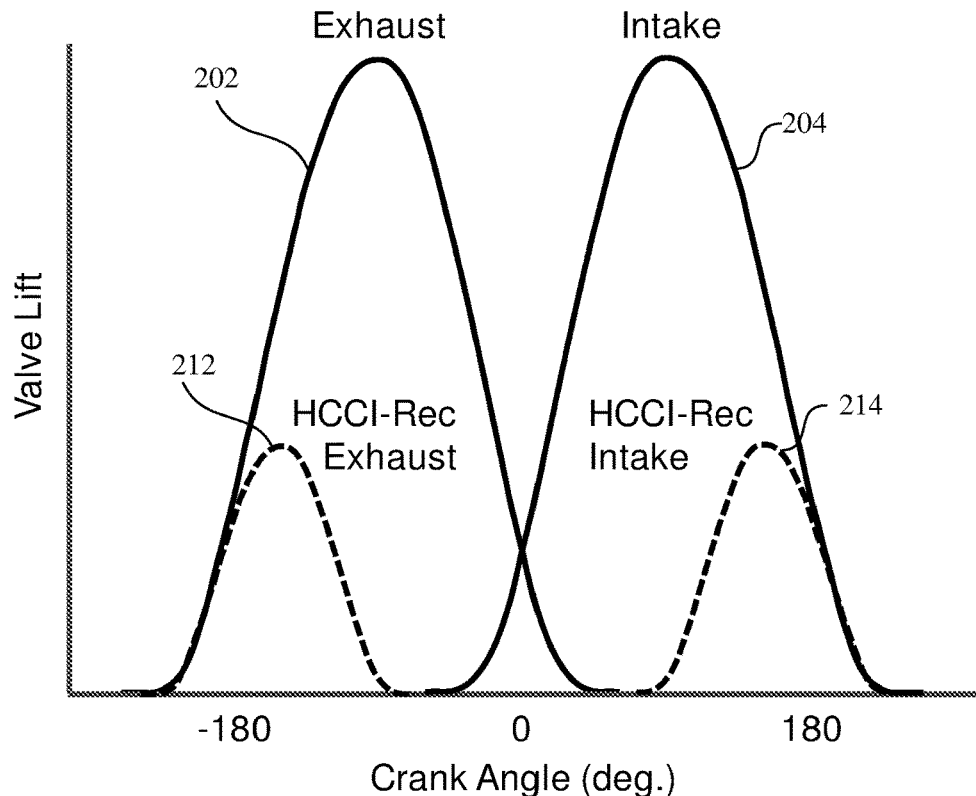
FIG. 2 shows representative intake and exhaust valve lift profiles required to run SI and HCCI working cycles using recompression in HCCI operation.

FIG. 2 shows representative intake and exhaust valve lift profiles for SI and HCCI operation. In FIG. 2 HCCI operation is maintained by recompression and re-expansion of trapped exhaust gases. Valve lift profiles 202 and 204 illustrate the exhaust and intake valve profiles, respectively, associated with a SI working cycle. Valve lift profile 212 and 214 illustrate the exhaust and intake valve profiles, respectively, associated with a HCCI working cycle. In the SI working cycle the valves have a higher lift profile and stay open longer than in the HCCI working cycle. In an SI working cycle both the intake and exhaust valves are typically open at 0 degrees of crank angle, corresponding to a top dead center (TDC) position of a piston in a cylinder (or more generally working chamber). In contrast, during HCCI with recompression and re-expansion, the exhaust valve closes very early to retain large amounts of hot residuals, which help promote auto-ignition for HCCI combustion. The intake valve opens late resulting in negative valve overlap in HCCI operation, in contrast to positive valve overlap in SI operation. During the time interval when both the exhaust and intake valves are closed the trapped exhaust gas is re-compressed and then re-expanded, acting as a gas spring. The recompression and re-expansion regions may be generally symmetric around TDC to minimize pumping losses. In some embodiments for both SI and HCCI operation, the intake and exhaust valve timing may be controlled independently, that is the phase of the intake and exhaust valve opening and closing can be independently adjusted using a cam phaser. A working chamber may be shifted between SI and HCCI operation by using a different cam profile, resulting in a different, non-zero valve lift profile for the two types of working cycles. It should be appreciated that the air charge associated with a SI and HCCI working cycle is generally different because of exhaust gas entrapment in the cylinder during portions of the exhaust and intake strokes when operating in HCCI.

Figure 3:
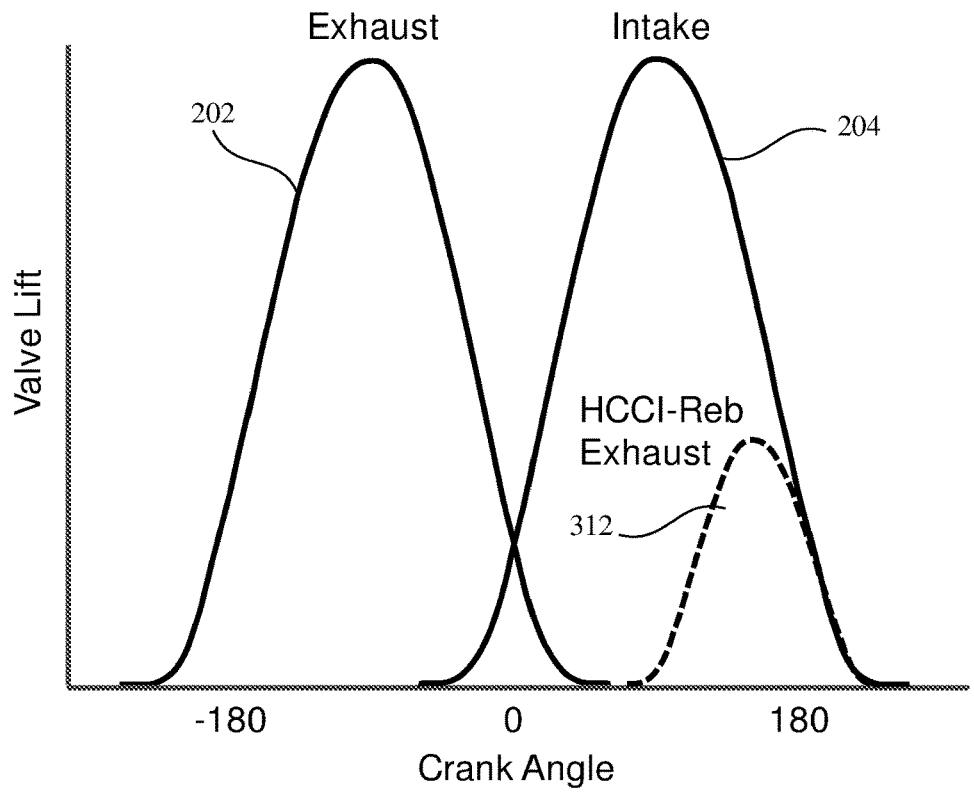
FIG. 3 shows valve lift profiles for an HCCI working cycle obtained by "rebreathing" exhaust gases.

FIG. 3 shows another HCCI control strategy called "rebreathing". The valve profiles 202 and 204 associated with spark ignition operation are as shown in FIG. 2. In HCCI with rebreathing, the exhaust valve vents in the exhaust stroke as it does during SI operation, profile 202. During the subsequent intake stroke the exhaust valve again opens following profile 312. Re-opening the exhaust valve during the intake stroke inducts hot exhaust gases into the cylinder, which help promote auto-ignition for HCCI combustion. As in HCCI with recompression, both the intake and exhaust valve timing may be phased independently to provide precise control over gases flowing into and out of the cylinder. The air charge associated with SI and HCCI with rebreathing are generally different because of induction of exhaust gases into the cylinder during the intake stroke during HCCI operation. The present invention may use HCCI with recompression or HCCI with rebreathing or may operate with both control strategies.

For both types of HCCI described above, or a similar LTGC operating strategy, excess oxygen in the exhaust stream may be minimized or eliminated by employing high levels of residual dilution of the cylinder charge and/or using an external exhaust gas recirculation system that introduces exhaust gases into an intake manifold that supplies air to the engine's cylinders. That is, the composition of the cylinder charge may be controlled so that the exhaust gases have little or no residual oxygen. When HCCI operates in such a manner, a three-way catalyst may be used to reduce noxious emissions in the exhaust stream coming from SI firings that may be interleaved with the HCCI firings.

Figure 4:
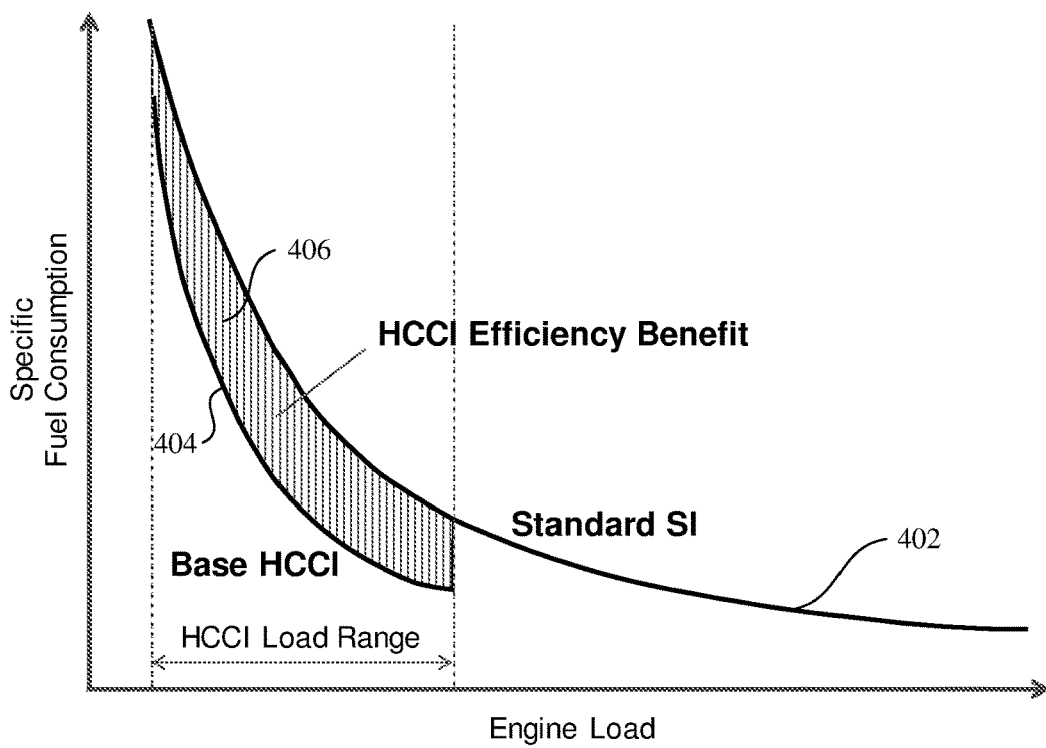
FIG. 4 shows representative specific fuel consumption for SI and HCCI engine operation within their respective operating ranges.

FIG. 4 shows representative specific fuel consumption for SI and HCCI operation within their respective operating ranges. Curve 402 depicts the specific fuel consumption for SI operation over its entire load range. Curve 404 depicts the specific fuel consumption over a typical load range for HCCI operation. Over this operating range the fuel efficiency benefits of HCCI operation are denoted by area 406. In prior art dual-mode SI-HCCI engines, the engine operated in HCCI mode when it is in that operating range and operated in SI mode when the engine load is above or below the HCCI range. There was a discrete switch in engine operating mode between SI and HCCI operation at both the low and high load HCCI limits. While these prior art dual-mode operation engine's improved fuel efficiency somewhat, the fuel efficiency gains were limited by the relatively narrow HCCI operating window. For clarity, the SI load curve 402 does not extend to zero load, where by definition the specific fuel consumption asymptotically approaches infinity; however, in practice an SI engine can operate stably under zero and low load conditions by heavy throttling of the air intake.

As described in Applicant's U.S. Pat. No. 9,399,964, which is incorporated herein by reference, an extension of dynamic skip fire (DSF) control is multi-level dynamic skip fire (mDSF) control. In general, multi-level dynamic skip fire contemplates the use of one or more intermediate (lower) firing state(s) such that different interspersed fired working cycles may produce different torque outputs. For example, in some embodiments the output of an intermediate firing may be on the order of 60 to 80% of a full firing charge. In some specific mDSF systems, a firing opportunity may be executed in three different states; a high charge fire, a low charge fire, or a skip, which provides finer control over the engine torque waveform than standard DSF, that does not have multiple discrete firing levels.

One potential advantage of using mDSF or more generally dynamic firing level modulation is the potential to attain better fuel efficiency. However, to realize efficiency gains the lower or intermediate output working cycles should operate more efficiently than the higher output working cycles. In some of the embodiments described in U.S. Pat. No. 9,399,964 working cycles with higher efficiency include an Atkinson cycle or Miller over-expanded cycle. For example, early intake valve closing (EIVC) and late intake valve closing (LIVC) strategies may be employed to achieve an effectively longer expansion stroke compared with the intake stroke. This augments work extraction for a given cylinder charge size and improves efficiency by more than 5% as compared to an SI working cycle. Based on a federal test protocol (FTP) drive cycle, the estimated fuel economy gains of mDSF over standard DSF are several percent.

Figure 5:
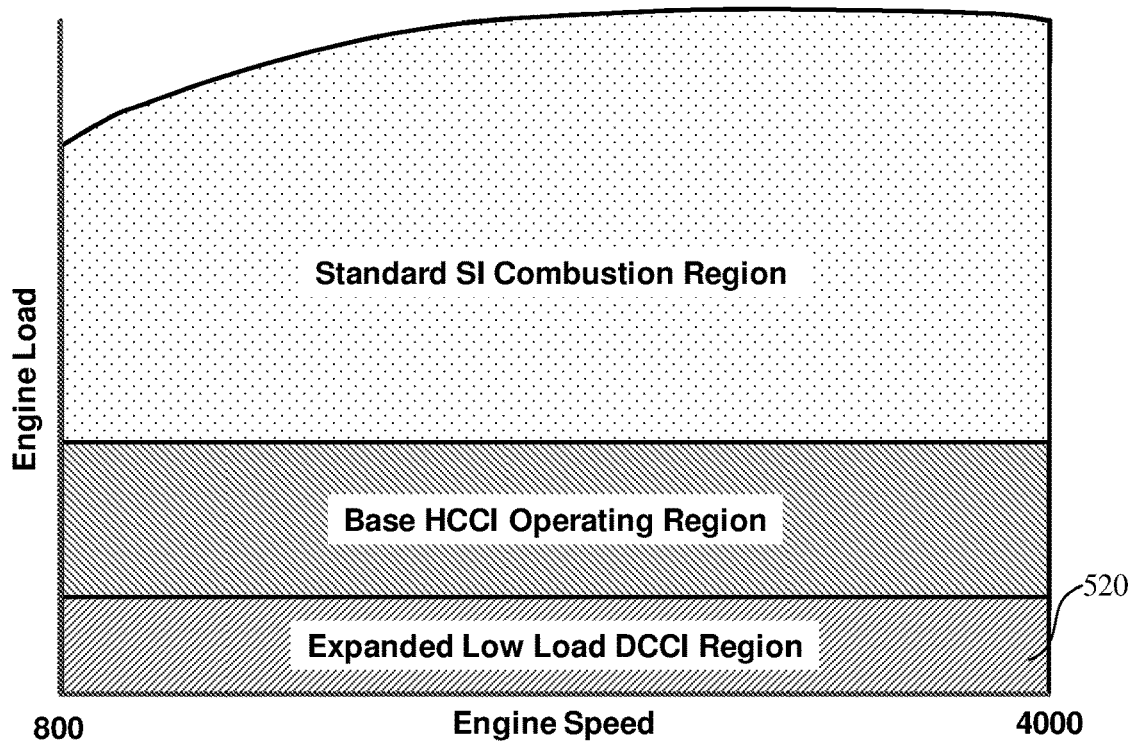
FIG. 5 shows an expanded low load, high efficiency operating region using dynamic charge compression ignition (DCCI) in accordance with a non-exclusive embodiment of the present invention.

Dynamic charge compression ignition (DCCI) is an extension of mDSF. In DCCI at least one mDSF firing level operates with a low temperature gasoline combustion working cycle, such as HCCI. HCCI is an ideal candidate for the low level or partial charge, since it is naturally restricted to lower loads. Due to the significantly higher efficiency of HCCI working cycles, the potential fuel economy gains of DCCI are significant. FIG. 5 shows an expanded low load, high efficiency operating region using low-load dynamic charge compression ignition (DCCI). By using DCCI, HCCI operation can be extended into the region 520, which includes zero load, without special control strategies to maintain combustion stability. The requested engine torque could be obtained by an engine controller specifying a firing density of HCCI firings mixed with skipped firing opportunities to deliver the requested torque. The HCCI firings may be evenly distributed using a sigma-delta controller or some other control strategy as described in incorporated U.S. Pat. No. 9,399,964 and some of the other previously cited Applicant's prior patents. The skipped working cycles may either deactivate the cylinder, so that no air is pumped through the cylinder, or simply skip fueling the cylinder while still pumping air. The latter strategy does not require valve deactivation hardware and thus may be less costly to implement. Since the working cycles are either skipped or use low temperature combustion, no special aftertreatment may be required in some embodiments. The engine controller may vary the charge associated with the HCCI firing and the firing density to maximize fuel efficiency and obtain acceptable noise, vibration, and harshness (NVH) performance An operating point that may be enabled by DCCI operation is engine idle, which generally occurs at engine speeds near 800 rpm and requires no output engine torque. Running all cylinders in HCCI mode produces more torque than required for idle without using special and potentially inefficient combustion control strategies. Using DCCI allows some cylinders to operate in an efficient HCCI regime, while other cylinders are skipped, so that the overall engine torque matches idle requirements.

Figure 6:
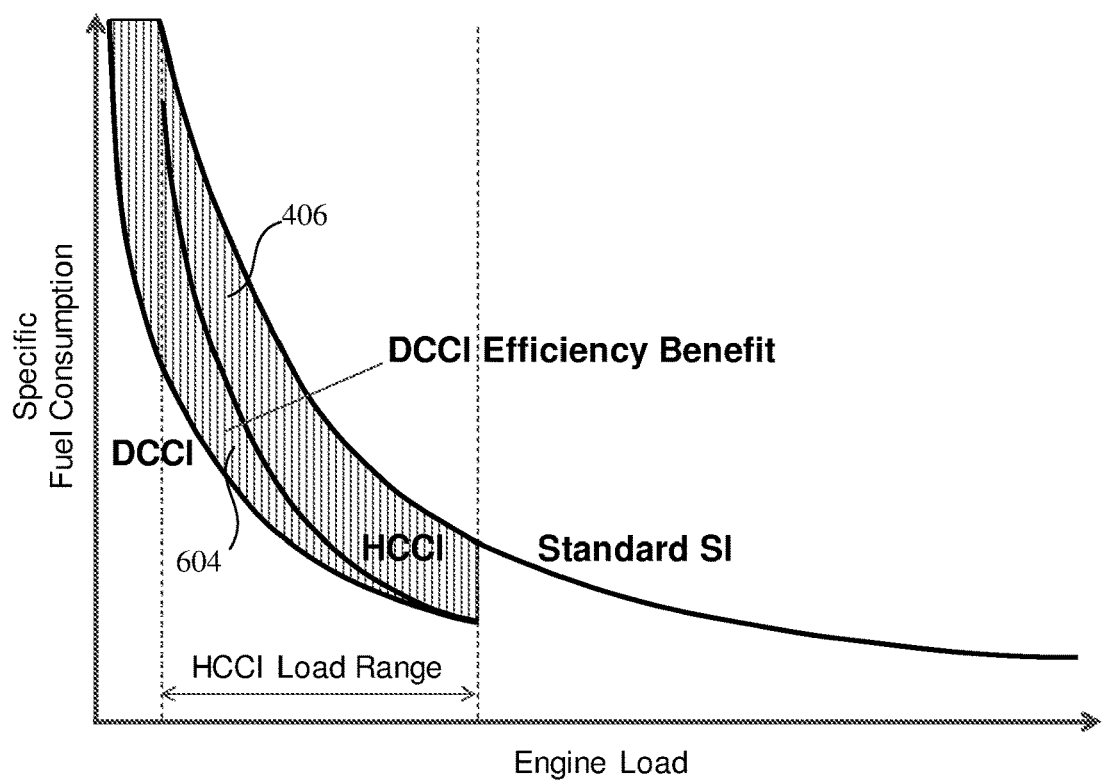
FIG. 6 shows an efficiency benefit of low-load DCCI operation in accordance with a non-exclusive embodiment of the present invention.

FIG. 6 shows an efficiency benefit of low-load DCCI operation. The region 406 is the same as shown in FIG. 4, which illustrates the benefit of dual-mode, SI/HCCI operation. By using DCCI additional fuel economy is obtained as denoted by region 604 lying between the HCCI and DCCI curve. While not shown in FIG. 6 region 604 extends to zero load and offers fuel savings over SI operation in the load range below the pure HCCI operating load range. In this embodiment, the engine control may revert to all-cylinder, SI operation for loads greater than the high load HCCI boundary. Operation in low-load DCCI generates little or no noxious emissions and thus no aftertreatment system is required while operating in this mode. A conventional three-way catalyst can clean up the exhaust gases when some or all cylinders are operating in SI mode, which may occur for loads above the HCCI load range. Rebalancing of the oxidation/reduction balance in the three-way catalyst, by running with a rich air/fuel ratio or injecting hydrocarbons into the catalyst, may be required when transitioning to SI operation.

Figure 7:
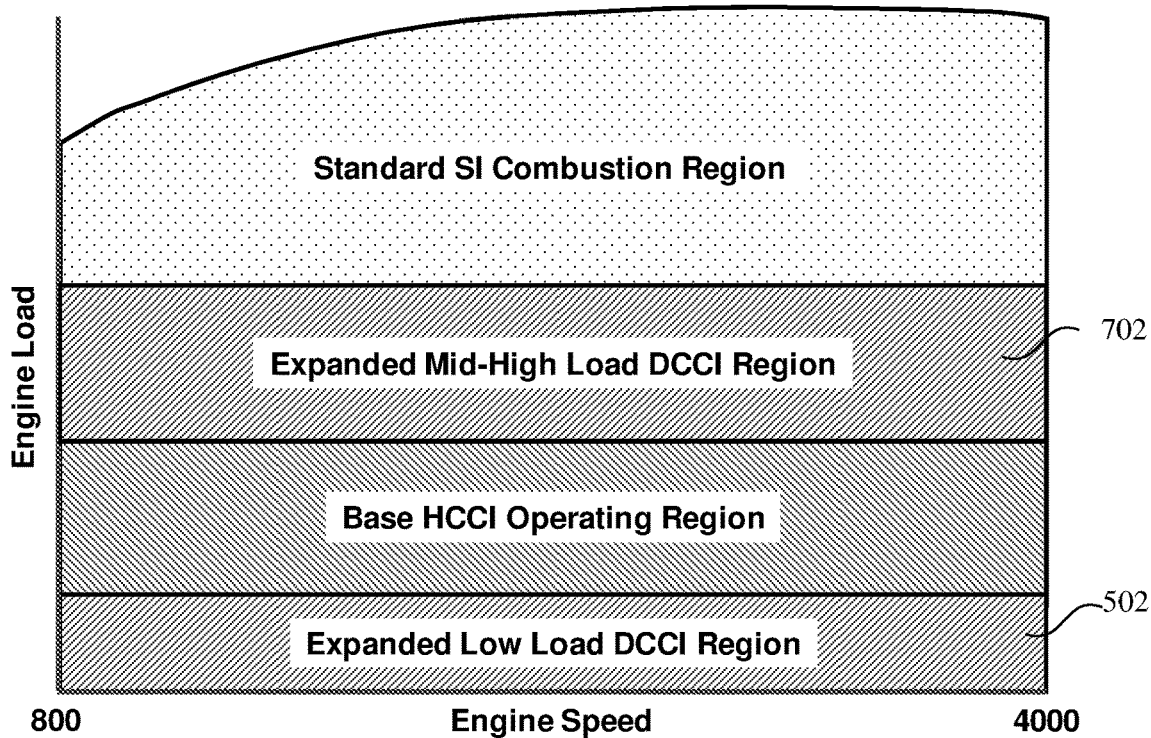
FIG. 7 shows an expanded mid-high load operating range enabled by DCCI operation in accordance with a non-exclusive embodiment of the present invention.

FIG. 7 shows an expanded high-efficiency operating range enabled by full DCCI, including the mid-high load region 702. In this mid-high load region 702, full DCCI would switch between SI working cycles, HCCI working cycles, and potentially skipped working cycles. The SI working cycles would potentially generate high $NO_x$ emissions and aftertreatment would be required in this operating region. A special aftertreatment system capable of removing $NO_x$ in a lean exhaust stream may be required. In other embodiments, the HCCI working cycles may operate with high dilution levels near a stoichiometric air/fuel ratio and thus a standard three-way catalyst may be used.

Figure 8:
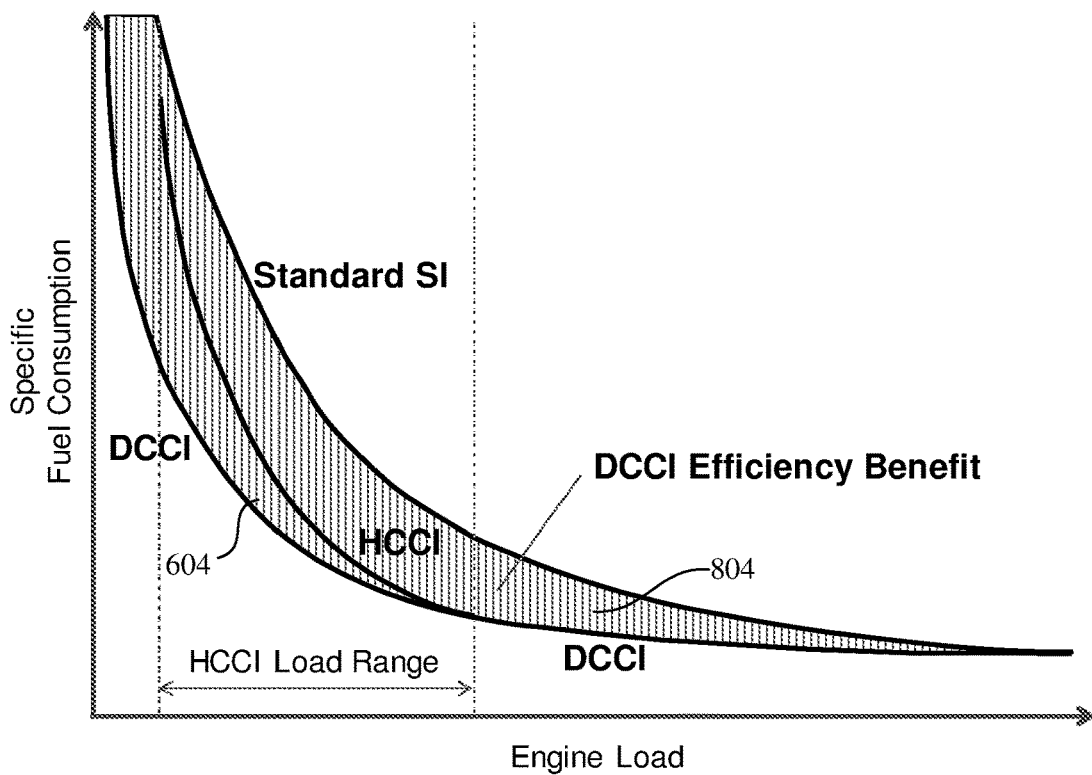
FIG. 8 shows fuel savings associated with DCCI operation over an engine's full load range in accordance with a non-exclusive embodiment of the present invention.

FIG. 8 shows the specific fuel consumption benefit associated with operating DCCI in the mid-high load region 702. Region 804 lying between the SI curve and DCCI curve in the load region above the HCCI operation limit denotes the fuel economy gain associated with this mode of operation. In this embodiment, DCCI blends standard SI, HCCI, and potentially cylinder skips to provide extended regions of high efficiency operation and a smooth SI-HCCI mode transition. Operation in the low load region for loads in and smaller than the HCCI load range may be as described before relative to FIGS. 5 and 6. Loads in this region may also be obtained by mixing SI, HCCI, and skipped working cycles. This may be advantageous if the resulting firing pattern provides improved fuel efficiency with acceptable NVH as compared to HCCI only operation.

Modeling indicates that full DCCI can potentially double the fuel efficiency benefit of mDSF using a Miller or Atkinson cycle as the low-level firing relative to standard DSF for a 2.0-L, 4-cylinder engine operated over a representative drive cycle. Full DCCI may employ HCCI over a relative narrow operating range, the base range 110 shown in FIG. 1 or an even smaller range, where HCCI operates robustly with minimal changes in engine hardware. Its implementation cost can be significantly lower than other advanced combustion strategies currently under investigation. Aftertreatment with a conventional three-way catalyst could be a challenge if running mixed mode HCCI/SI where the combined exhaust stream will likely be fuel-lean. Some embodiments may utilize a $NO_x$ trap or selective catalyst reduction to reduce $NO_x$ emissions in an oxygen rich exhaust. In other embodiments, HCCI may be operated over a more limited range with appropriate exhaust gas dilution such that excess oxygen levels in the exhaust stream are minimized. In either case a DCCI system provides a cost effective path to improve fuel economy.

Figure 9:
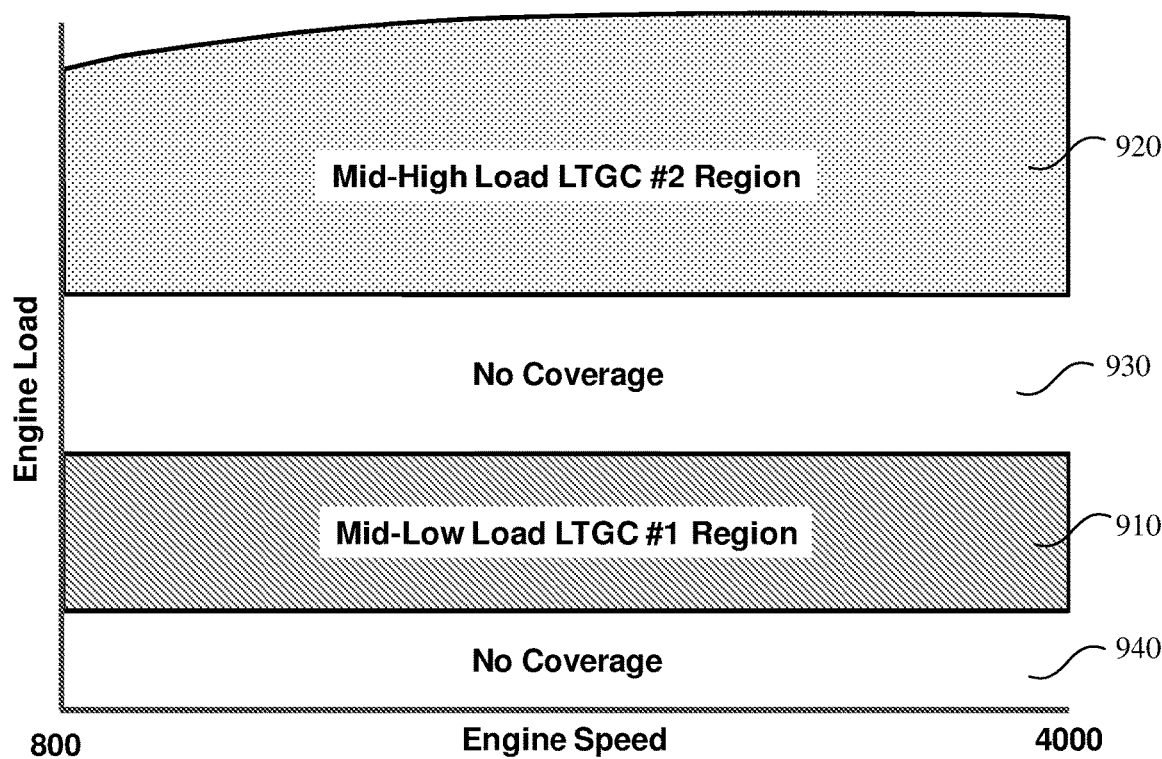
FIG. 9 shows operating ranges for two distinct, high-efficiency, low temperature gasoline combustion (LTGC) regions.

FIG. 9 shows operating ranges for two distinct LTGC operating regions. The mid-low load region, LTGC #1, is denoted as region 910. The mid-high load region, LTGC #2, is denoted as region 920. HCCI is a subset of LTGC and could correspond to LTGC #1, region 910. Other types of low temperature gasoline combustion working cycles may operate in the mid-high load region 920. These cycles include, but are not limited to, spark assisted compression ignition (SACI), partial premixed compression ignition (PPCI) and boosted HCCI. If the cycle is boosted, that is the air pressure in the intake manifold is above atmospheric pressure, the air pressure boost may be achieved using either a turbocharger or supercharger. Both LTGC #1 and LTGC #2 are only viable within certain constrained operating ranges, region 910 and 920, respectively, and thus would not provide the full dynamic coverage required for motor vehicle operation. By mixing firings between the two regions, the intermediate load region 930 may be covered. By mixing firings from region 910, and perhaps region 920, with skips, the low load region 940 may be covered.

Figure 10:
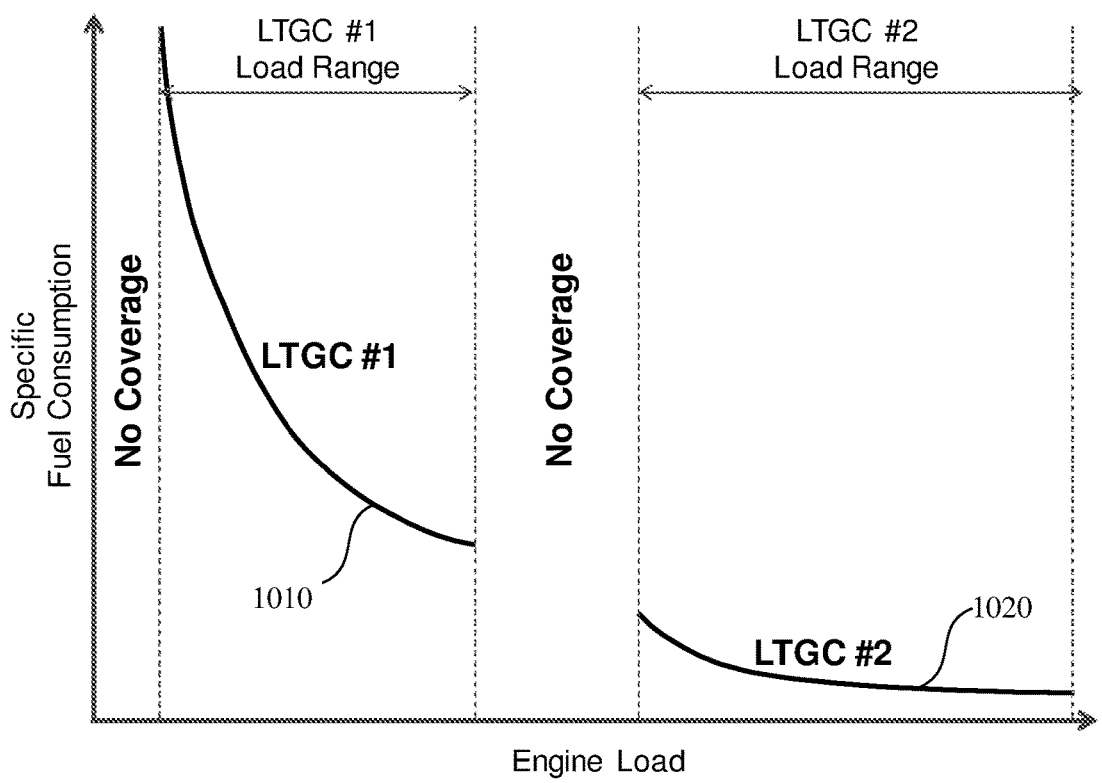
FIG. 10 shows specific fuel consumption for a low load and high load LTGC working cycle.

FIG. 10 shows representative specific fuel consumption of LTGC #1 and LTGC #2 working cycles. Curve 1010 may be the specific fuel consumption versus load for HCCI operation. Curve 1020 is the specific fuel consumption for some form of a LTCG working cycle that works at higher cylinder loads than curve 1010. Both of these working cycles may provide significant benefits, such as improved fuel economy and lower $NO_x$ emissions, as compared to SI working cycle operation. There are regions where each of the working cycles alone cannot cover.

Figure 11:
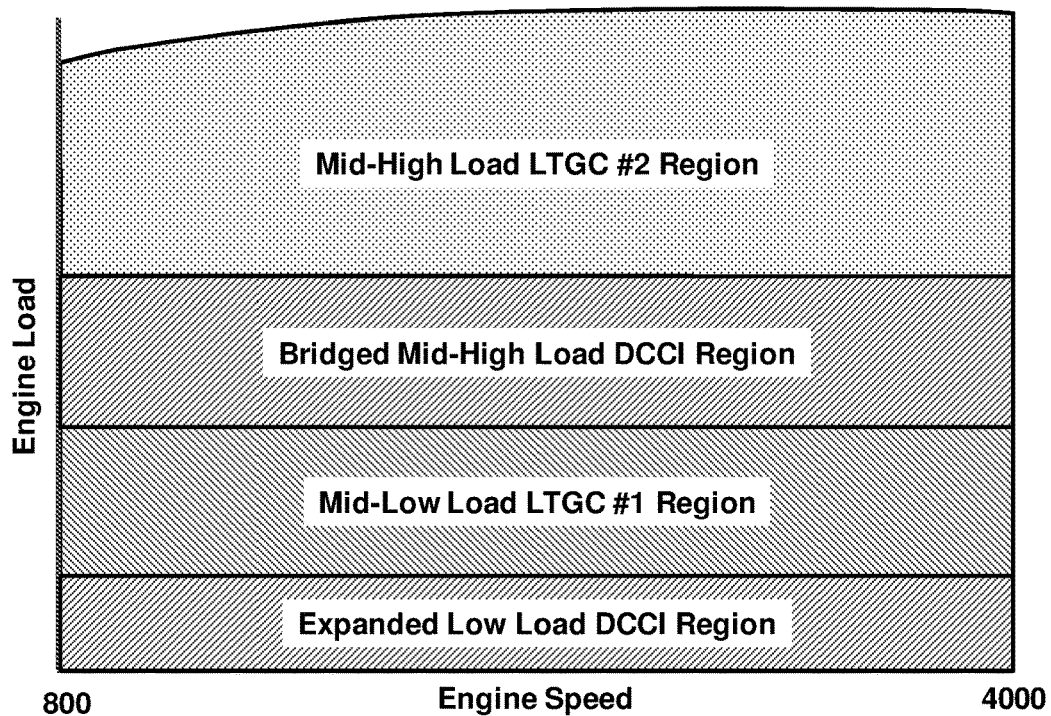
FIG. 11 shows DCCI being used to operate over a full load range in accordance with a non-exclusive embodiment of the present invention.

By mixing LTGC #1, LTGC #2, and skipped working cycles, complete coverage over the entire engine load range may be obtained as shown in FIG. 11. FIG. 11 shows DCCI being use to both expand the high efficiency LTGC #1 region to zero load and also to bridge the gap between the two LTGC operating strategies shown in FIG. 10. Each cylinder could potentially switch between LTGC #1, LTGC #2 and skipping based on the desired torque level.

Figure 12:
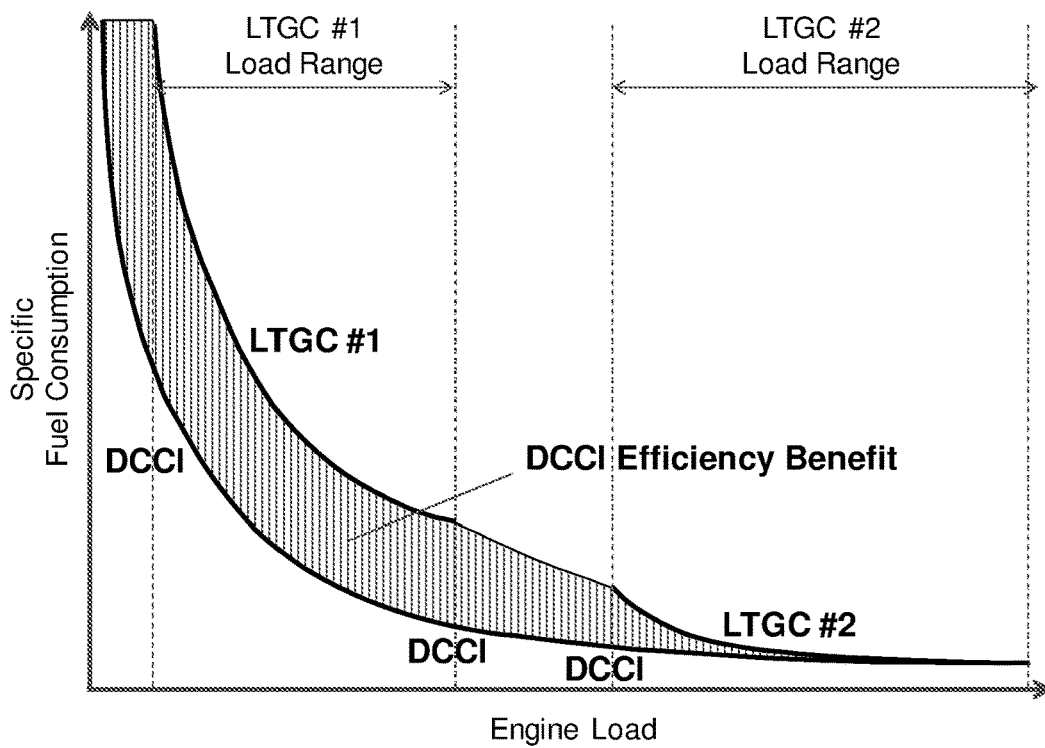
FIG. 12 shows a DCCI fuel consumption benefit over a full load range in accordance with a non-exclusive embodiment of the present invention.

FIG. 12 shows the DCCI fuel consumption benefit, which includes an expanded low load range and a bridged gap where originally there was no coverage. By switching among LTGC #1, LTGC #2 and skipping, it is possible to bridge the coverage gaps and provide an even larger fuel consumption reduction compared to operation with LTGC #1 alone.

Dynamic firing level modulation controllers suitable for determining which working cycles to skip, fire at a high output level, and fire at a lower or intermediate level during DCCI operation are described in U.S. Pat. Nos. 9,689,328; 9,476,373; 8,099,224 (each of which is incorporated herein by reference) and other of Applicant's patents and patent applications.

In some preferred embodiments, the firing level decisions are made on a firing opportunity by firing opportunity basis although, that is not a requirement. In some embodiments, for example, the determination of a then current desired effective firing fraction and the determination of the appropriate firing level (e.g., high, low, skip, etc.) for the next determined working cycle are make on a firing opportunity by firing opportunity basis. An advantage of firing opportunity by firing opportunity control is that it makes the engine very responsive to changed inputs and/or conditions. Although firing opportunity by firing opportunity determination of the firing sequence is very effective, it should be appreciated that the firing decisions can be refreshed more slowly while still providing good control (e.g., the firing fraction/sequence determinations may be performed every revolution of the crankshaft, every two or more firing opportunities, etc.).

Various implementations of the invention are very well suited for use in conjunction with dynamic firing level modulation operation in which an accumulator or other mechanism tracks the portion of a firing that has been requested, but not delivered, or that has been delivered, but not requested such that firing decisions may be made on a firing opportunity by firing opportunity basis. However the described techniques are equally well suited for use in virtually any firing level modulation application including operation using fixed firing patterns or firing sequences. Similar techniques may also be used in conjunction with variable stroke engine control in which the number of strokes in each working cycle are altered to effectively vary the displacement of an engine.

The described approaches are particularly well suited for use in dynamic firing level modulation engine operation in which some firing opportunities utilize low temperature combustion. Low temperature combustion has an advantage of being more efficient than many other types of working cycles. It also has an advantage in producing near complete fuel oxidation and little $NO_x$ generation, such that no aftertreatment system is required in some cases.

Simulated Test Results

Simulated test results of running an internal combustion engine in a lean burn mode with dynamic skip fire (DSF) demonstrate a number of synergistic benefits.

One such benefit is that the useful operating range of lean burn expands to lower torque levels with DSF than otherwise possible with simply lean burn. This benefit is highlighted in a comparison of engine maps depicted in FIG. 1 versus FIG. 5.

In FIG. 1, the lean burn (e.g., base HCCI) operating mode is limited to a narrow torque (engine load) bandwidth 110 over a wide range of engine speeds. Standard SI combustion is needed if the demanded torque is either above or below this range.

In contrast, the engine may operate in the lean burn mode at low torque demands with DSF. FIG. 5 shows an expanded lean burn (e.g., low load DCCI) region at low torque loads replacing standard SI combustion. When DSF and lean burn combustion are combined, an air-fuel ratio greater than 1.0 can be used at lower normalized torque values than previously possible. As a result, improved fuel consumption is realized under low torque conditions.

Figure 13:
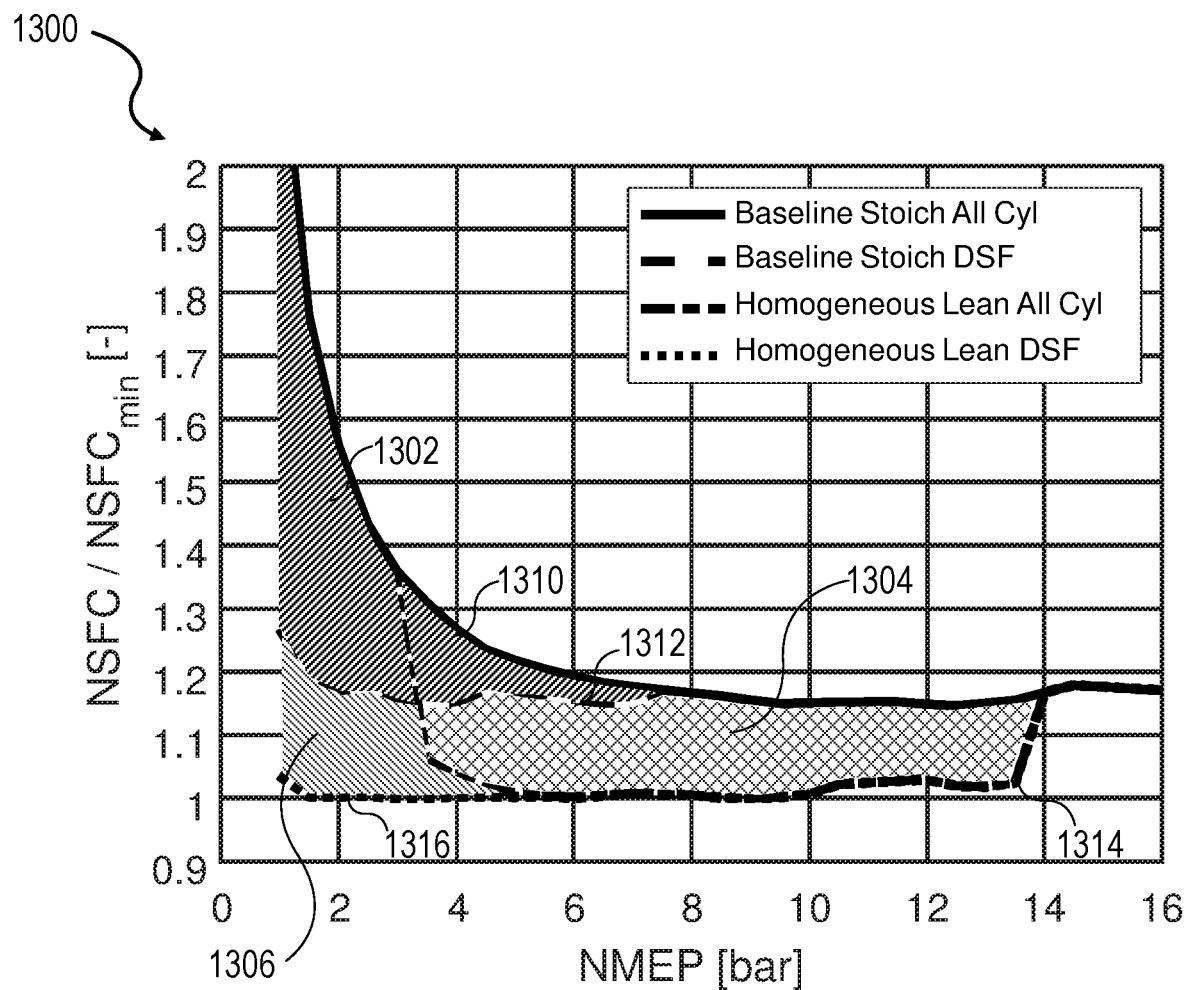
FIG. 13 is a plot illustrating fuel efficiency benefits of operating an internal combustion engine with both homogeneous lean burn combustion and dynamic skip fire engine control in accordance with the present invention.

Referring to FIG. 13, a plot 1300 further illustrating the synergistic benefit of operating an internal combustion engine using both lean burn combustion and DSF is shown. In this plot, Net Specific Fuel Consumption (NSFC) values are provided along the vertical axis, while normalized torque values (NMEP) are provided along the horizontal axis. The plot 1300 has four curves. Curve 1310 represents baseline operation of a stoichiometrically fueled engine operating on all cylinders. Torque generation is controlled by a throttle that can reduce air pressure in an intake manifold that feeds air into the engine reducing an inducted air charge. Curve 1312 represents stoichiometric combustion with dynamic skip fire control. Here torque control is primarily achieved by changing the firing density of the cylinders of the engine. Curve 1314 represents homogeneous, lean burn combustion on all engine cylinders. This curve coincides with curve 1310 in the low torque and high torque regions. Overlap occurs because at low torques the combustion needs to be stoichiometric to maintain combustion stability. At high torques, stoichiometric combustion is required to generate the necessary power. In the intervening region, between approximately 3 and 14 bar NMEP, operation with homogeneous lean burn combustion offers significant fuel savings as compared to stoichiometric operation. Curve 1316 represents homogeneous, lean burn combustion with the dynamic skip fire control. This curve overlaps with curve 1314, except for low torques below approximately 5 bar NMEP. Here the low torques are achieved by skipping firing opportunities, so combustion stability may be maintained on the firing cylinders.

Region 1302 illustrates the improved fuel efficiency obtained with stoichiometric combustion and DSF control as compared to all cylinder operation with stoichiometric combustion. The region 1304 illustrates the improved fuel efficiency obtained with all cylinder homogeneous lean burn combustion as compared to all cylinder stoichiometric combustion. The region 1306 illustrates the improved fuel efficiency obtained by DSF control with homogenous lean burn combustion as compared to stoichiometric. Combining DSF control with homogeneous lean burn combustion maximizes fuel economy for low torque outputs.

Figure 14:
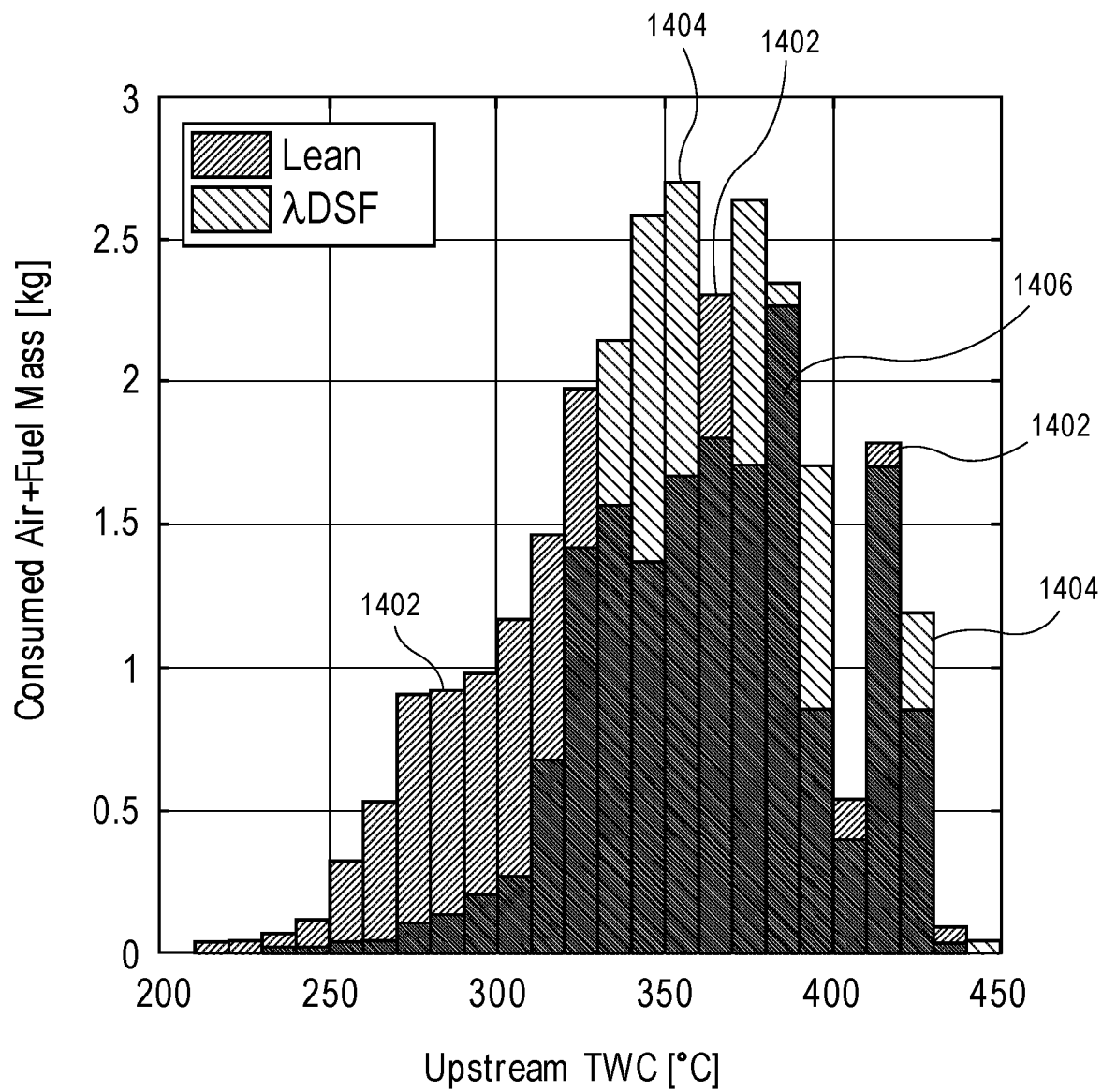
FIG. 14 is a bar chart illustrating improved exhaust temperature control resulting from homogenous, lean burn combustion with dynamic skip fire control of an internal combustion engine in accordance with a non-exclusive embodiment of the present invention.

Another advantage of combining DSF control with homogenous lean burn combustion is that engine exhaust gas temperature can be raised and better controlled. Referring to FIG. 14, a chart 1400 showing test results demonstrating improved exhaust temperature control is shown. Along the horizontal axis, upstream TWC temperatures are provided in Celsius (C) as measured by an exhaust gas temperature gauge. The vertical axis provides a range of consumed air-fuel mass values.

In the chart 1400, the medium shaded bars 1402 provide exhaust temperatures at various consumed air-fuel mass values for all cylinder homogeneous lean burn operation (denoted in the figure as Lean).

The light shaded bars 1404 provide exhaust temperatures at various consumed air-fuel mass values for homogeneous, lean burn combustion with DSF control (denoted in the figure as λDSF).

The dark shaded bars 1406 are provided where the bars 1402, 1404 overlap. When a light shaded bar 1404 is higher than the corresponding dark shaded bar 1406, the height of the dark shaded bar equals the medium shaded bar 1402 (i.e., the upstream TWC temperatures for λDSF is greater than all cylinder lean burn). When the medium shaded bar 1402 is higher than the dark shaded bar 1406, the height of the dark shaded bar 1406 equals the light shaded bar 1404 (e.g., the upstream TWC temperatures for all cylinder lean burn is greater than λDSF).

The chart 1400 thus shows the exhaust temperature distribution for λDSF is both narrower and higher than all cylinder operation, which generally improves aftertreatment system efficacy reducing harmful emissions.

Multiple Aftertreatment Systems for Different Combustion Modes

The various modes of engine operation noted above have advantages and disadvantages. For example:

(1) Throttle-controlled, spark-ignition or "SI" combustion engines can operate over a wide range of high torque and engine speed demands These engines may be either naturally aspirated or may be boosted with the inducted air above atmospheric pressure. SI type combustion engines can operate over this wide range at a stoichiometric air/fuel ratio. If operated with a stoichiometric air/fuel ratio a three-way catalytic converter type aftertreatment system may be used. For lean air/fuel stoichiometries, other types of aftertreatment systems are generally required. A limitation of three-way catalytic converter aftertreatments is that they require, on average, a stoichiometric air/fuel ratio and thus are limited to use with SI engines.

(2) For low load DCCI operation (e.g., FIG. 5), little to no noxious emissions are generated, and as a result, no aftertreatment system may be needed. However, at expanded high load DCCI operation (e.g., FIG. 7), high levels of $NO_x$ are potentially generated, requiring an aftertreatment system capable of reducing $NO_x$ emissions.

(3) HCCI at low torque loads provides the benefits of high fuel efficiency and low levels of harmful admissions. At higher torque loads however, $NO_x$ emissions become excessive, requiring an aftertreatment system capable of reducing $NO_x$ emissions.

With an internal combustion engine capable of operating in multiple modes, a single aftertreatment system may be inadequate. Using two aftertreatment systems, one for SI stoichiometric operation and the other for lean burn operation, would be advantageous.

Figure 15:
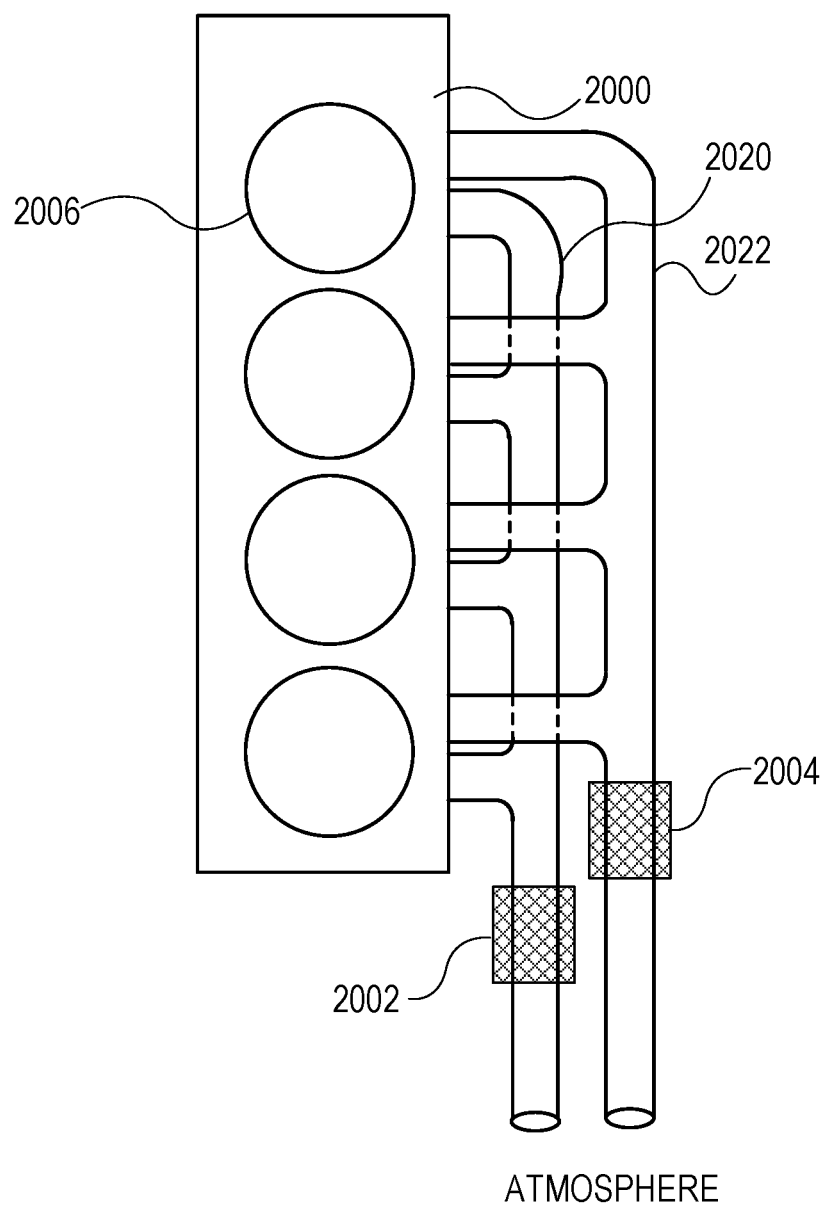
FIG. 15 shows an internal combustion engine and two aftertreatment systems.

Referring to FIG. 15, an internal combustion engine 2000, a first exhaust system 2020 with a first aftertreatment system 2002 and a second exhaust system 2022 with a second aftertreatment system 2004 is shown. The internal combustion engine 2000 includes four (4) cylinders 2006. In various embodiments, each of the four cylinders 2006 can be configured to either operate (a) in only a stoichiometric mode, (b) in only a lean burn mode, or (c) selectively in both stoichiometric and lean burn modes.

Depending on a cylinder's configuration, it exhausts to either the first exhaust system 2020, the second exhaust system 2022, or both the first and second exhaust systems 2020 and 2022. The output of the two exhaust systems 2020, 2020 exhaust to the atmosphere after the exhaust passes through either the first aftertreatment system 2002 or the second aftertreatment system 2004 respectively. The outputs of the two exhaust systems 2020 and 2022 may be joined prior to reaching the atmosphere or may individually exhaust to the atmosphere as shown in FIG. 15.

The stoichiometric modes may include conventional spark-ignited (SI) operation, and under certain operating conditions, LTGC operation as well. With LTGC, stoichiometric operation can be achieved by substituting large amounts of oxygen depleted exhaust or residual gasses, such as generated by Exhaust Gas Recirculation (EGR), instead of air into the cylinders. As a result, $O_2$ levels remain sufficiently low for TWC aftertreatment systems, making LTGC possible in the stoichiometric mode. In addition, Otto, Miller and Atkinson are each examples of thermodynamic cycles that generally, although not exclusively, use stoichiometric SI combustion.

The lean burn modes may include HCCI operation, LTGC operation, GDCI operation, SACI operation, PPCI operation, and Diesel operation. With lean burn Diesel operation, certain cylinders can be operated in a premixed and/or partially premixed burn, resulting in cleaner and more efficient operation at lower loads. In addition, lean burn variations of Miller and Atkinson cycles are also considered examples of lean burn modes of operation.

As described above in certain load and speed ranges some cylinders of an engine may be operating in a stoichiometric mode, while other cylinders are operating in a lean burn mode. Under other circumstances, some cylinders may be skipped as well.

Figure 16:
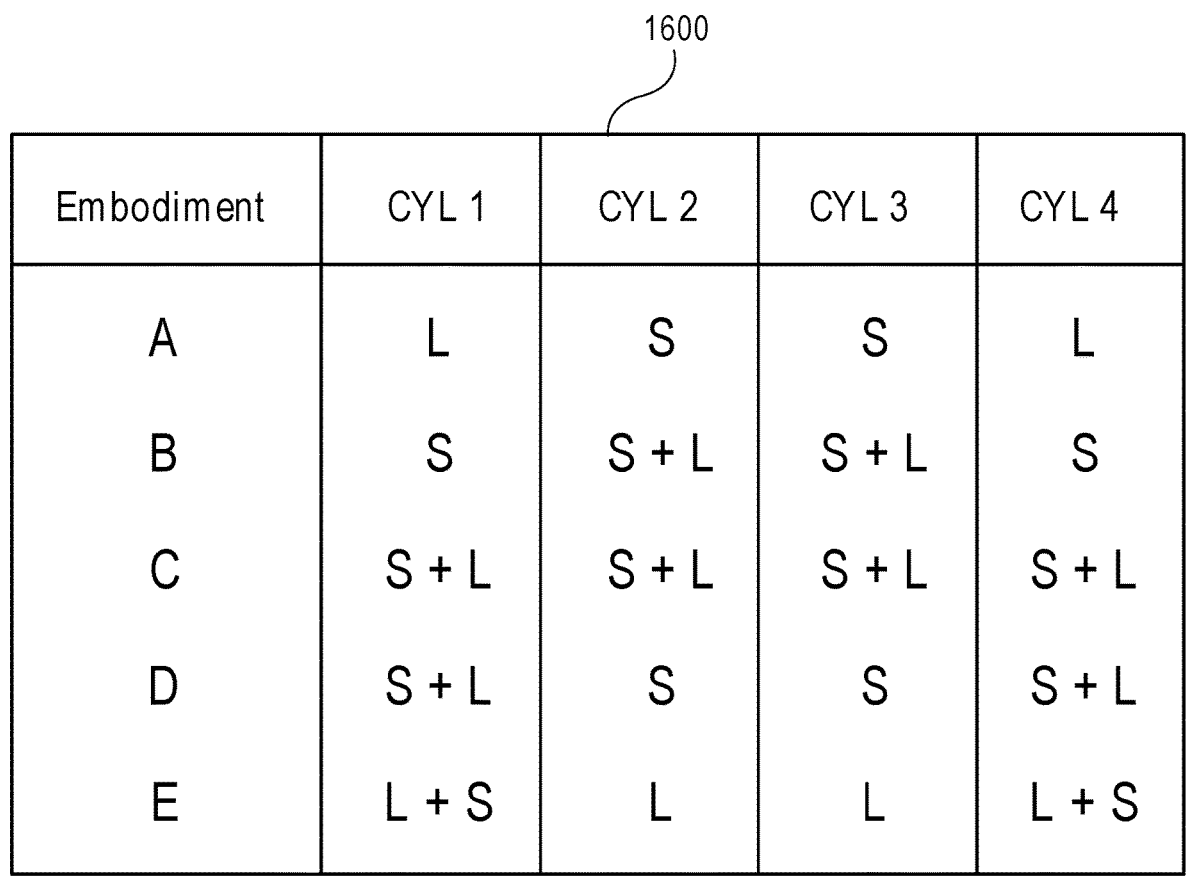
FIG. 16 shows a table listing multiple embodiments for operating an engine in both stoichiometric and lean burn modes in accordance with a non-exclusive embodiment of the present invention.

Referring to FIG. 16, a table 1600 showing various non-exclusive embodiments of operating the four-cylinder internal combustion engine 2000 in various combinations of stoichiometric ("S") and lean burn ("L") modes is illustrated. Each embodiment is designated A through E in the left column. Within the row for each embodiment, the "S" or "L" mode of operation for each of the four cylinders (CYL 1, CYL 2, CYL 3 and CYL 4) is provided. For instance:

With embodiment A, the four cylinders CYL 1, CYL 2, CYL 3 and CYL 4 are designated to operate in the L, S, S and L modes respectfully;

With embodiment B, the four cylinders CYL 1, CYL 2, CYL 3 and CYL 4 are designated to operate in the S, S+L, S+L and S modes respectfully;

With embodiment C, the four cylinders CYL 1, CYL 2, CYL 3 and CYL 4 are designated to operate in the S+L, S+L, S+L and S+L modes respectfully;

With embodiment D, the four cylinders CYL 1, CYL 2, CYL 3 and CYL 4 are designated to operate in the S+L, S, S and S+L modes respectfully; and With embodiment E, the four cylinders CYL 1, CYL 2, CYL 3 and CYL 4 are designated to operate in the L+S, L, L and L+S modes respectfully.

In some embodiments, the cylinders are organized into two groups; one for stoichiometric operation only and the other for lean burn operation only (e.g., embodiment A).

In other embodiments, all the cylinders can operate in both the stoichiometric and lean burn modes (e.g., embodiment C).

In yet other embodiments, the cylinders are organized into one group of cylinders operating in a specific mode (lean burn or stoichiometric) and the other group capable of operating in both modes (e.g., embodiments B, D, and E).

It should be understood that the embodiments provided in FIG. 16 are merely illustrative and should be in no way considered limiting. On the contrary, any possible combination of stoichiometric and lean burn operation may be used by an internal combustion engine, regardless of the number of cylinders. For instance, with internal combustion engines having 1, 2, 4, 6, 8, 12 or more cylinders, one or more cylinders can be configured to operate in (a) only the stoichiometric mode, (b) only the lean burn mode or (c) both modes. As such, the number of possible combinations are too numerous to exhaustively list herein.

Figure 17:
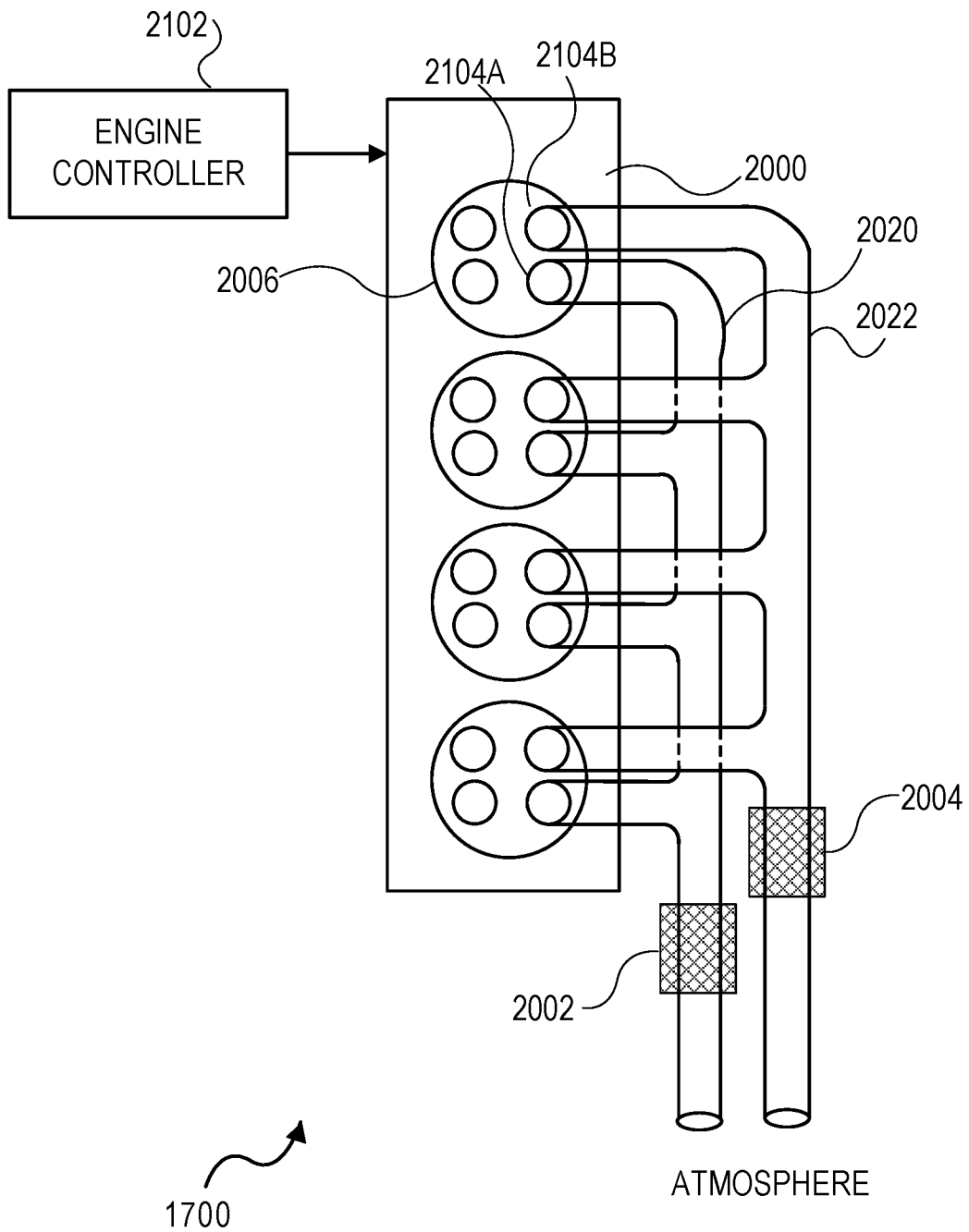
FIG. 17 illustrates a cylinder of an internal combustion engine and first and second aftertreatment systems in accordance with the present invention.

Referring to FIG. 17, a drawing 1700 illustrating an engine controller 2102 selectively coupling the exhaust of a representative cylinder 2006 of the internal combustion engine 2000 is shown. Similar to many of the embodiments of FIG. 16, the one cylinder 2006 is capable of operation in either a stoichiometric mode or a lean burn mode. The cylinder 2006 includes two exhaust valves 2104A and 2104B. The first exhaust valve 2104A, when opened, provides a passageway to the first exhaust system 2020, which directs exhaust gases thru first aftertreatment system 2002. The second exhaust valve 2104B, when opened, provides a passageway to the second exhaust system 2022, which directs exhaust gases thru second aftertreatment system 2004.

In the non-exclusive embodiment shown, the first aftertreatment system 2002 is configured for a first mode of operation. The second aftertreatment system 2004 is configured for a second mode of operation. For example, the first aftertreatment system 2002 may be optimized for stoichiometric operation, while the second aftertreatment system 2004 may be optimized for lean burn operation. In other embodiments, the first aftertreatment system 2002 may be configured for stoichiometric operation and the second aftertreatment system 2004 configured for both stoichiometric and lean burn operation.

During operation of the internal combustion engine 2000, the engine controller 2102 controls the two exhaust valves 2104A and 2104B of each of the cylinders 2006. When a working cycle of a cylinder is stoichiometric, the engine controller 2102 opens its exhaust valve 2104A, while closing the exhaust valve 2104B. As a result, combustion gases and any combustion particulates are provided a pathway to and exhausted through the first aftertreatment system 2002. Alternatively, when the working cycle of a cylinder 2006 is lean burn, the engine controller 2102 opens the exhaust valve 2104B, while closing the exhaust valve 2104A. As a result, combustion gases and any combustion particulates pass and are exhausted through the second aftertreatment system 2004.

It should understood that FIG. 17 shows all cylinders capable of exhausting into both exhaust systems, but this is not a requirement. In some embodiments of the internal combustion engine 2000, certain cylinders may be capable of operating only in either only the stoichiometric or lean burn mode and thus exhaust only into the appropriate exhaust system for that combustion mode. In these cases, only a single exhaust valve is required; however, it still may be advantageous to provide two exhaust valves that exhaust into a common aftertreatment system.

Figure 18:
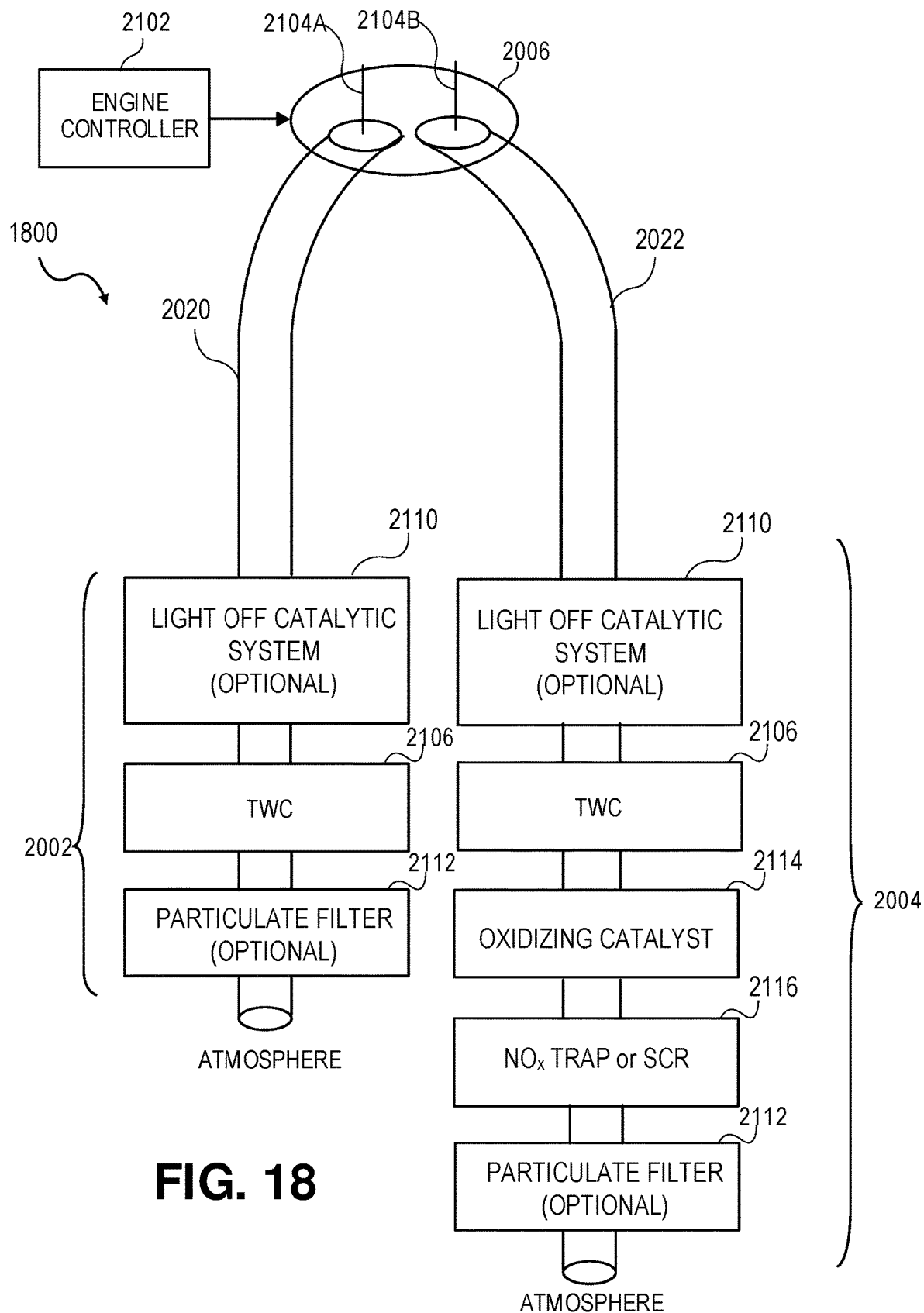
FIG. 18. illustrates another embodiment of cylinder of an internal combustion engine and first and second aftertreatment systems in accordance with the present invention.

Referring to FIG. 18, a diagram 1800 shows additional detail of an embodiment of an engine with two distinct aftertreatment systems. In this embodiment, the first aftertreatment system 2002 may be configured for operation with exhaust products from nominally stoichiometric combustion, while the second aftertreatment system 2004 is nominally used for both stoichiometric and lean burn combustion.

If cylinder 2006 operates in a stoichiometric combustion mode, the combustion exhaust products are exhausted into the first aftertreatment system 2002 via the exhaust valve 2104A and a first exhaust system 2020. The first aftertreatment system 2002 includes an optional light-off catalytic system 2110, a TWC 2106, and an optional particulate filter 2112.

If cylinder 2006 operates in a lean burn combustion mode, the combustion exhaust products are exhausted into the second aftertreatment system 2004 via the exhaust valve 2104B and a second exhaust system 2022. The second aftertreatment system 2004 may be configured for both lean burn combustion and stoichiometric combustion, including: (a) an optional light off catalytic converter system 2110 (b) a TWC 2106 (c) an oxidizing catalyst 2114 (d) a $NO_x$ trap and/or a Selective Catalytic Reduction (SCR) system, (e) a particulate filter or any combination of (a) through (e). Not all the elements (a) thru (e) are necessary in the aftertreatment system. For example, if the second aftertreatment system only accepts combustion exhaust gases from LTGC, little $NO_x$ will be generated and a $NO_x$ trap and SCR may not be necessary. In fact, in some situations no aftertreatment elements may be needed in the second exhaust system 2022. It should be appreciated that the size and make-up of the various elements in the first and second aftertreatment systems may be different. For example, the TWC 2106 may be a different size in the first and second aftertreatment system.

The optional light-off catalytic converter 2110 may be provided, upstream from other aftertreatment system elements in close proximity to the internal combustion engine 2000. Since the light-off catalytic converter 2110 is in close proximity to the engine 2000, it heats up quickly after a cold start. As a result, the light-off catalytic converter 2110 is able to convert harmful exhaust gases into more benign gases following a cold start sooner than other aftertreatment elements. The light-off catalytic converter 2110; however, is typically smaller and has insufficient conversion capacity for sustained operation. As a result, the other aftertreatment elements handle the majority of exhaust gas conversion once the engine and exhaust system heat up.

The optional particulate filter 2112 is provided to remove harmful particulates, such as soot, resulting as a byproduct of fuel combustion. In various embodiments, the particulate filter may be a wall flow filter, a silicon carbide filter, a ceramic fiber filter, a metal fiber flow through filter, a paper filter, or any other type of filter suitable for removing particulates.

With lean burn modes of operation, the resulting cylinder exhaust will include relatively high levels of oxygen ($O_2$). Conventional TWCs used for stoichiometric operation do not function very well in converting nitrogen oxides to nitrogen in the presence of high levels of oxygen, since they rapidly become saturated with oxygen and will no longer reduce $NO_x$. As a result, a $NO_x$ trap or SCR is used in the second aftertreatment system 2004 to reduce $NO_x$ levels.

While FIG. 18 shows the first aftertreatment system 2002 as configured for stoichiometric combustion and the second aftertreatment system 2004 configured for both stoichiometric and lean burn combustion it should be appreciated that other configurations are possible. For example, the second aftertreatment system 2004 may be configured solely for lean burn combustion. In this case the TWC 2106 may be removed.

Figure 19:
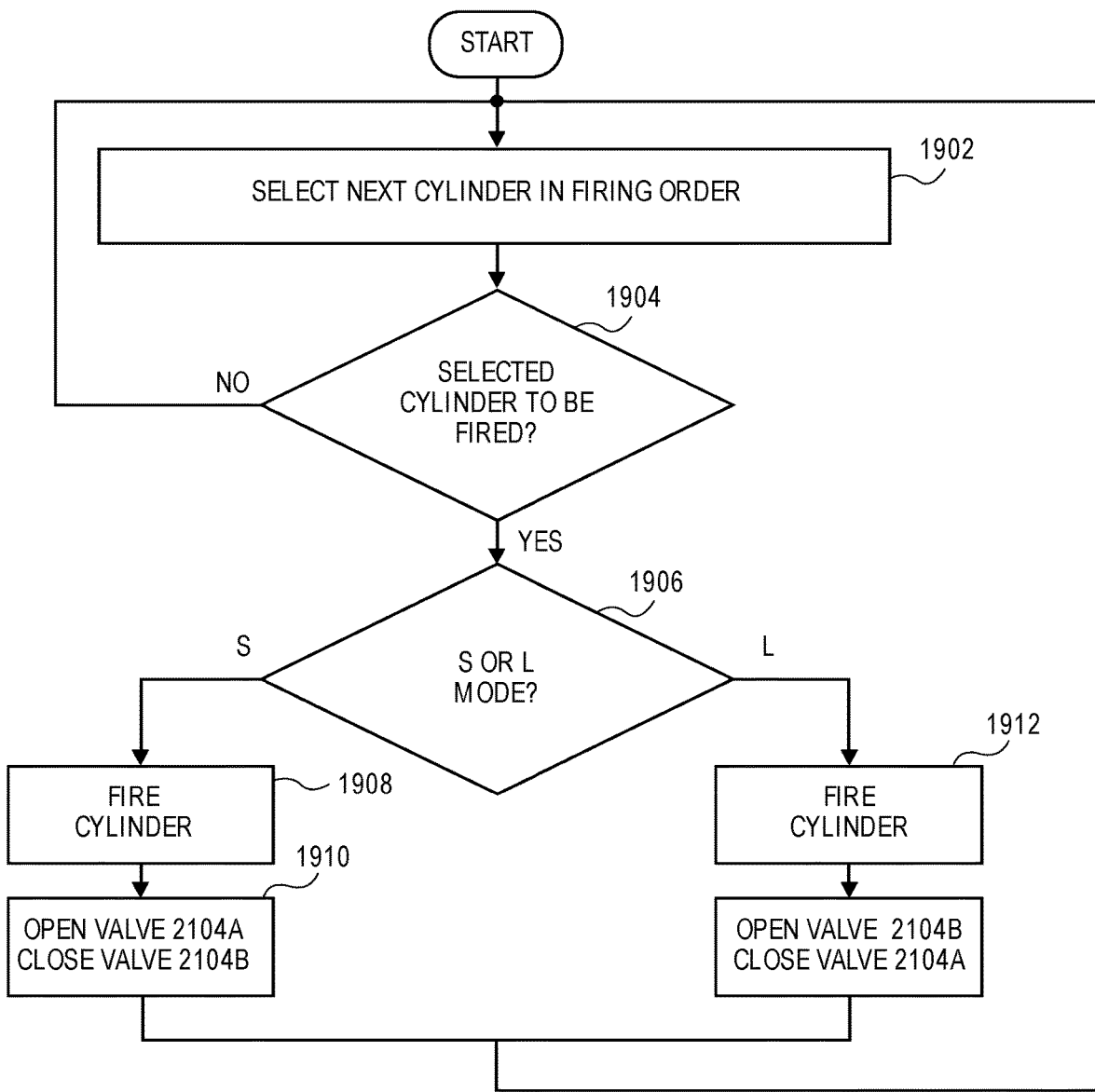
FIG. 19 illustrates a flow diagram for controlling operation of an internal combustion engine in a stoichiometric or lean burn mode in accordance with a non-exclusive embodiment of the present invention.

Referring to FIG. 19, a flow diagram 1900 illustrating steps implemented by the engine controller 2102 for operating an internal combustion engine with two aftertreatment system is illustrated.

In step 1902, the engine controller 2102 selects the next cylinder in the firing order of the internal combustion engine 2000.

In decision step 1904, the engine controller 2102 makes a decision to fire or not fire the next cylinder prior to the start of the next working cycle for the cylinder. The decision may be made on a firing opportunity by firing opportunity basis, although this is not a requirement.

With a skip decision, the flow chart returns to start and the next cylinder in the firing order is selected in step 1902.

If a decision is made to fire the selected cylinder, then in decision step 1906, either stoichiometric or lean burn operation is selected. In making this decision, the engine controller 2102 can use a wide range of factors, such as the current engine load or torque, engine speed, etc. Also, if some cylinders cannot operate in all modes, such as cases A, B, D, and E in table 1600 (see FIG. 16), then the decision taken must be compatible with the selected working cycle mode, i.e. stoichiometric burn or lean burn.

If the decision in step 1906 is a stoichiometric fire, then the flow chart 1900 proceeds to step 1908. In steps 1908 and 1910, the engine controller 2102 operates the cylinder in the stoichiometric mode and opens exhaust valve 2104A during the exhaust stroke of the working cycle, while the other exhaust valve 2104B is closed. As a result, the exhaust is pass through the first aftertreatment system 2002 (see FIG. 18).

Alternatively, if the decision in step 1906 is a lean burn fire, then the flow chart 1900 proceeds to step 1912. In steps 1912 and 1914, the engine controller 2102 operates the cylinder in the lean burn mode and opens exhaust valve 2104B during the exhaust stroke of the working cycle, while the other valve 2104A is closed. As a result, the exhaust is pass through the second aftertreatment system 2004 as depicted in the FIG. 18 embodiment.

It should be also appreciated that any of the control operations described herein may be implemented using executable computer code stored in a suitable computer readable medium. The operations are carried out when a processor executes the computer code. The computer code may be incorporated in an engine controller that executes dynamic firing level modulation engine operation. The invention has been described primarily in the context of gasoline powered, 4-stroke piston engines suitable for use in motor vehicles. However, it should be appreciated that the described methods and apparatus are very well suited for use in a wide variety of internal combustion engines. These include engines for virtually any type of vehicle—including cars, trucks, boats, aircraft, motorcycles, scooters, etc.; and virtually any other application that involves the firing of working chambers and utilizes an internal combustion engine. The various described approaches work with engines that operate under a wide variety of different thermodynamic cycles—including virtually any type of Otto cycle engines, Miller cycle engines, Atkinson cycle engines, Diesel cycle engines, Wankel engines and other types of rotary engines, hybrid engines, radial engines, etc. It is also believed that the described approaches will work well with newly developed internal combustion engines regardless of whether they operate utilizing currently known, or later developed thermodynamic cycles.

Some of the above embodiments contemplate the deactivation of a working chamber during skipped working cycles. In various implementations, the deactivation of a working chamber involves preventing the pumping of air through the skipped working chamber during one or more selected skipped working cycles. A working chamber may be skipped or deactivated in a variety of ways. In various approaches, a low pressure spring is formed in the working chamber i.e., after exhaust gases are released from the working chamber in a prior working cycle, neither the intake valves nor the exhaust valves are opened during a subsequent working cycle, thus forming a low pressure vacuum in the working chamber. In still other embodiments, a high pressure spring is formed in the skipped working chamber i.e., air and/or exhaust gases are prevented from escaping the working chamber. The working chamber may be deactivated in any suitable manner such that the working chamber contributes little or no net power during its power stroke.

Although only a few embodiments of the invention have been described in detail, it should be appreciated that the invention may be implemented in many other forms without departing from the spirit or scope of the invention. For example, the control strategies described herein could be implemented with a fully flexible valve trains that is not dependent on a camshaft for valve event timing. While the invention has generally been describe as using an intake and exhaust valve to control induction and exhaust of a cylinder, a cylinder may have multiple intake and/or exhaust valves and the control strategies may collectively control their motion. While the invention has generally been described as using gasoline as a fuel, many other types of fuel with gasoline-type combustion qualities may be used either singly, as a mixture, or in a dual fuel system with different fuels used on different types of working cycles. Such fuels include, but are not limited to, hydrogen, ethanol, propanol, other alcohols, synthetic fuels, and natural gas. Therefore, the present embodiments should be considered illustrative and not restrictive and the invention is not to be limited to the details given herein.

What is claimed is:

1. A method of controlling operation of an internal combustion engine having a plurality of working chambers, the method comprising:
   operating the internal combustion engine in a skip fire operational mode wherein one or more working cycles of the plurality of working chambers are either selectively fired or skipped;
   during some fired working cycles, using a lean air-fuel mixture and selectively operating the associated working chambers in one of a Homogeneous Charge Compression Ignition (HCCI) mode, a Gasoline Direct Compression Ignition (GDCI) mode, a Spark Assisted Compression Ignition Mode (SACI) mode, or a Dynamic Charge Compression Ignition (DCCI) mode; and
   during other fired working cycles, selectively firing the associated working chambers using a stoichiometric air-fuel mixture, and
   wherein the lean air-fuel mixture firings and the stoichiometric firings are intermixed.

2. The method of claim 1, further comprising:
   ascertaining a torque demand for the internal combustion engine;
   selecting the working cycles of the working chambers that are skipped or fired based on at least in part on the ascertained torque demand; and
   wherein a determination of whether lean air-fuel mixture firings can be used is based at least in part on the ascertained torque demand.

3. The method of claim 1, wherein a range of torque values for which lean air-fuel mixture firings are used is expanded when one or more of the working cycles of the working chambers are skipped relative to when all working cycles of the working chambers are fired.

4. The method of claim 1, further comprising:
   ascertaining a torque demand for the internal combustion engine;
   determining if the ascertained torque demand is below a threshold; and
   if the ascertained torque demand is below the threshold, selectively skipping the firing of one or more work cycles of the working chambers so as to sustain combustion of the other fired working cycles using the lean air fuel mixture.

5. The method of claim 1, further comprising operating the internal combustion engine in a dynamic skip fire mode where a decision to either fire or skip each of the working chambers is made on a firing opportunity-by-firing opportunity basis.

6. The method of claim 1, wherein for any given engine state with intermixed stoichiometric and lean air-fuel ratio working cycle firings, the stoichiometric working cycle firings have a higher torque output than the working cycles fired using a lean air-fuel ratio.

7. The method of claim 1, further comprising promoting auto-ignition of the lean air-fuel mixture during the working cycles that utilize the lean air-fuel mixture by introducing hot exhaust gases into the fired working chambers.

8. The method of claim 7, wherein the hot exhaust gases are introduced by one of the following:
   (a) re-circulating of the hot exhaust gases from an exhaust system to the working chambers;
   (b) inducting the hot exhaust gases into the working chambers by opening exhaust valves during intake strokes of the working chambers;
   (c) retaining residuals of the hot exhaust gases in the working chambers from previously fired working cycles; or
   (d) any combination of (a) through (c).

9. The method of claim 1, further comprising selectively deactivating skipped working cycles of the working chambers by (a) not fueling and (b) preventing air from pumping through the working chambers during the select skipped working cycles.

10. The method of claim 1, further comprising selectively allowing air to pump through, but not fueling, select skipped working cycles of the working chambers.

11. The method of claim 1, further comprising, as torque demands for the internal combustion engine vary, operating the working chambers of the internal combustion engine by:
   (a) repeatedly deciding to either skip or fire the working cycles of the working chambers as needed to meet the varying torque demands; and
   (b) for the fired working cycles of the working chambers, repeatedly deciding to use either the stoichiometric air-fuel mixture or the lean air-fuel mixture for combustion,
   whereby outcomes of the repeated decisions (a) and (b) are made at least in part to satisfy the varying torque demands and improve fuel economy, while providing acceptable levels of Noise, Vibration and Harshness (NVH).

12. The method of claim 1, further comprising selectively increasing a temperature of exhaust gases from the internal combustion engine by increasing a number of the working cycles that are fired using the stoichiometric mixture.

13. A method of controlling operation of an internal combustion engine having a plurality of working chambers, the method comprising:
   operating the internal combustion engine in a skip fire operational mode wherein one or more working cycles of the plurality of working chambers are either selectively fired or skipped;
   during some fired working cycles, using a lean air-fuel mixture and selectively operating the associated working chambers in one of a Homogeneous Charge Compression Ignition (HCCI) mode, a Gasoline Direct Compression Ignition (GDCI) mode, a Spark Assisted Compression Ignition Mode (SACI) mode, or a Dynamic Charge Compression Ignition (DCCI) mode; and
   during other fired working cycles, selectively firing the associated working chambers using a stoichiometric air-fuel mixture, and
   selectively decreasing a temperature of exhaust gases from the internal combustion engine by increasing a number of the working cycles that are fired using the lean air-fuel mixture.

14. The method of claim 1, further comprising passing exhaust gases resulting from combustion of the lean air-fuel mixture through one or more of the following aftertreatment systems:
   a light off catalytic system;
   a three-way catalyst;
   an oxidizing catalyst;
   a $NO_x$ trap;
   a Selective Catalytic Reduction (SCR) system; or
   a particulate filter.

15. The method of claim 1, further comprising passing exhaust gases resulting from combustion of the stoichiometric air-fuel mixture through one or more of the following aftertreatment systems:
   a light off catalytic system;
   a three-way catalyst; or
   a particulate filter.

16. A method of controlling operation of an internal combustion engine having a plurality of working chambers, comprising:
   operating the internal combustion engine in a skip fire operational mode in which one or more working cycles of the plurality of working chambers are either selectively fired or skipped; and
   for working chambers that are fired, during at least some of the fired working cycles, operating the working chambers in one of a Homogeneous Charge Compression Ignition (HCCI) mode, a Gasoline Direct Compression Ignition (GDCI) mode, a Spark Assisted Compression Ignition Mode (SACI) mode, or a Dynamic Charge Compression Ignition (DCCI) mode; and
   wherein a density of the skipped working cycles is selected, at least in part to sustain combustion in one of the HCCI, GDCI, SACI or DCCI modes during at least some of the fired working cycles.

17. The method of claim 16, further comprising for working chambers that are fired during other working cycles, operating the working chambers in a stoichiometric mode.

18. The method of claim 17, further comprising deciding to individually operate the working cycles of the working chambers in either the stoichiometric mode or one of the HCCI, GDCI SACI, or DCCI modes based on factors including (a) a torque demand; (b) fuel consumption and (c) Noise, Vibration and Harshness (NVH).

19. The method of claim 16, further comprising:
   ascertaining a torque request;
   determining if the ascertained torque request is within a range of torque values suitable for combustion using a lean air-fuel mixture; and
   operating the fired working chambers in one of the HCCI, GDCI SACI, or DCCI modes when the ascertained torque request is within the range of torque values suitable for combustion using the lean air-fuel mixture.

20. The method of claim 19, further comprising: operating other fired working cycles of the working chambers in a stoichiometric mode when the torque request is outside the range of torque values suitable for combustion using the lean air-fuel mixture.

21. The method of claim 19, wherein the range of torque values is expanded when one or more of the working cycles of the working chambers is/are skipped relative to when all working cycles of the working chambers are fired.

22. A method of controlling operation of an internal combustion engine having a plurality of working chambers, the method comprising:
  operating the internal combustion engine in a skip fire operational mode in which one or more working cycles of the plurality of working chambers are selectively fired or skipped; and
  for working chambers that are fired, during at least some of the fired working cycles, operating the working chambers in one of a Homogeneous Charge Compression Ignition (HCCI) mode, a Gasoline Direct Compression Ignition (GDCI) mode, a Spark Assisted Compression Ignition Mode (SACI) mode, or a Dynamic Charge Compression Ignition (DCCI) mode;
  ascertaining a torque demand for the internal combustion engine;
  determining if the ascertained torque demand is below a threshold; and
  if the ascertained torque demand is below the threshold, selectively skipping the firing of one or more work cycles of the working chambers so as to sustain combustion in one of the HCCI, GDCI, SACI or DCCI modes during other fired work cycles.

23. The method of claim 16, further comprising operating the internal combustion engine in a skip fire mode, wherein for a given reduced effective displacement that is less than full displacement of the internal combustion engine, at least one working chamber is fired, skipped and either fired or skipped over successive firing opportunities.

24. The method of claim 16, further comprising operating the internal combustion engine in a dynamic skip fire mode where a decision to either fire or skip the working chambers is made on a firing opportunity-by-firing opportunity basis.

25. The method of claim 16, wherein for the working cycles of the working chambers that are fired, selectively modulating torque output to be either a high torque output or a low torque output.

26. The method of claim 16 further comprising, during selected fired working cycles:
  providing a lean air-fuel mixture to an associated working chamber;
  compressing the lean air-fuel mixture in the working chamber;
  causing a triggered combustion event within the working chamber while the air-fuel mixture is compressed within the working chamber; and
  combusting the compressed lean air-fuel mixture within the working chamber in response to the triggered combustion event.

27. The method of claim 26, wherein causing the triggered combustion event within the working chamber further comprises:
  direct injecting fuel into the working chamber;
  using a spark to ignite the direct injected fuel.

28. The method of claim 26, further comprising:
  ascertaining a torque load for the working chamber;
  determining if the ascertained torque load is within a torque range for combustion of the lean air-fuel mixture; and
  introducing the lean air-fuel mixture into the working chamber; and
  combusting the lean air-fuel mixture in the working chamber during the working cycle.

29. The method of claim 26, wherein the torque range is expanded when one or more of the working cycles of the working chambers are skipped relative to when all working cycles of the working chambers are fired.

30. The method of 26, further comprising:
  ascertaining a torque load for a select working cycle of a select working chamber;
  determining if the ascertained torque load is outside of a torque range for the lean air-fuel mixture; and
  if the ascertained torque is outside the torque range, introducing a stoichiometric air-fuel mixture into the select working chamber; and
  combusting the stoichiometric air-fuel mixture in the select working chamber during the select working cycle.

31. The method of claim 26, further comprising:
  ascertaining a torque demand for the internal combustion engine;
  determining if the ascertained torque demand is below a threshold; and
  if the ascertained torque demand is below the threshold, selectively skipping the firing of one or more work cycles of the working chambers so as to sustain combustion of other fired working cycles of the working chambers using the lean air-fuel mixture.

32. The method of claim 26, further comprising operating the internal combustion engine in a skip fire mode, wherein for a given reduced effective displacement that is less than full displacement of the internal combustion engine, at least one working chamber is fired, skipped and either fired or skipped over successive firing opportunities.

33. The method of claim 26, further comprising operating the internal combustion engine in a dynamic skip fire mode wherein a decision to either fire or skip each of the working chambers is made on a firing opportunity-by-firing opportunity basis.

34. The method of claim 26, wherein for the working cycles of the working chambers that are fired, selectively modulating torque output to be either a high torque output or a low torque output.

35. The method of claim 26, further comprising operating the internal combustion engine in a reduced displacement mode where a first group of working chambers are continually fired and a second group of working chambers are continually skipped for the duration of the internal combustion engine operating in the reduced displacement mode.

36. The method of claim 16 wherein at least some of the fired working cycles are operated in the SACI mode.

37. The method of claim 16 wherein at least some of the fired working cycles are operated in the HCCI mode.

38. The method of claim 16 wherein at least some of the fired working cycles are operated in the GDCI mode.

39. The method of claim 16 wherein at least some of the fired working cycles are operated in the DCCI mode.

* * * * *